(12) United States Patent
Buvat et al.

(10) Patent No.: US 11,390,702 B2
(45) Date of Patent: *Jul. 19, 2022

(54) PARTICLES SUITABLE FOR CATALYZING OXYGEN REDUCTION OR HYDROGEN OXIDATION AND BEING PROTON-CONDUCTING BY GRAFTING SPECIFIC PROTON-CONDUCTING FLUORINATED POLYMERS TO THE SURFACE THEREOF

(71) Applicant: COMMISSARIAT À L'ÉNERGIE ATOMIQUE ET AUX ÉNERGIES ALTERNATIVES, Paris (FR)

(72) Inventors: Pierrick Buvat, Montbazon (FR); Janick Bigarre, Tours (FR); Delphine Dru, Sorigny (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 452 days.

This patent is subject to a terminal disclaimer.

(21) Appl. No.: 16/325,568

(22) PCT Filed: Aug. 18, 2017

(86) PCT No.: PCT/FR2017/052245
§ 371 (c)(1),
(2) Date: Feb. 14, 2019

(87) PCT Pub. No.: WO2018/033688
PCT Pub. Date: Feb. 22, 2018

(65) Prior Publication Data
US 2019/0177461 A1 Jun. 13, 2019

(30) Foreign Application Priority Data
Aug. 19, 2016 (FR) ..................................... 16 57828

(51) Int. Cl.
*C08F 12/20* (2006.01)
*H01M 4/90* (2006.01)
(Continued)

(52) U.S. Cl.
CPC ........... *C08F 212/30* (2020.02); *B01J 31/123* (2013.01); *B01J 37/0219* (2013.01); *C08F 12/20* (2013.01);
(Continued)

(58) Field of Classification Search
CPC ...... C08F 212/30; C08F 212/14; C08F 12/20; C08F 12/30; C08F 292/00; C08F 2438/01;
(Continued)

(56) References Cited

U.S. PATENT DOCUMENTS

| 10,673,076 B2 * | 6/2020 | Buvat | B01J 37/06 |
| 10,886,538 B2 * | 1/2021 | Buvat | C08F 112/30 |
| 2016/0308230 A1 | 10/2016 | Buvat et al. | |

FOREIGN PATENT DOCUMENTS

| FR | 2 982 173 A1 | 5/2013 |
| FR | 2 982 264 A1 | 5/2013 |

(Continued)

OTHER PUBLICATIONS

Dru et al. "Fluorine-Free Pt Nanocomposites for Three-Phase Interfaces in Fuel Cell Electrodes", ACS Catal. 2016, 6, 6993-7001, pubs.acs.org/acscatalysis (Year: 2016).*
(Continued)

*Primary Examiner* — Michael M. Bernshteyn
(74) *Attorney, Agent, or Firm* — Pearne & Gordon LLP

(57) ABSTRACT

Proton-conducting, fluorinated polymer grafted particles for use in the preparation of catalytic layers for fuel cells, such as $H_2$/air cells or $H_2/O_2$ cells. The grafted particles include a particle made of a material for catalyzing oxygen reduction (Continued)

or hydrogen oxidation, such as a platinum particle, that has been grafted with a proton-conducting, fluorinated polymer graft. The proton-conducting, fluorinated polymer graft includes an organic spacer group, a single bond or an organic spacer group, a repeating unit resulting from polymerization of a fluorinated styrenic monomer, and a repeating unit resulting, from polymerization of a non-fluorinated styrenic monomer bearing at least one proton-conducting group.

10 Claims, 2 Drawing Sheets

(51) Int. Cl.

| | | |
|---|---|---|
| *H01M 4/92* | (2006.01) | |
| *C08K 3/08* | (2006.01) | |
| *C08F 12/30* | (2006.01) | |
| *C08K 5/00* | (2006.01) | |
| *B01J 31/12* | (2006.01) | |
| *B01J 37/02* | (2006.01) | |
| *C08F 292/00* | (2006.01) | |
| *C08L 25/18* | (2006.01) | |
| *C08F 212/14* | (2006.01) | |
| *C08K 5/372* | (2006.01) | |

(52) U.S. Cl.
CPC ............ *C08F 12/30* (2013.01); *C08F 212/20* (2020.02); *C08F 292/00* (2013.01); *C08K 3/08* (2013.01); *C08K 5/0091* (2013.01); *C08K 5/372* (2013.01); *C08L 25/18* (2013.01); *H01M 4/9008* (2013.01); *H01M 4/923* (2013.01); *B01J 2531/828* (2013.01); *C08F 2438/01* (2013.01); *C08L 2312/00* (2013.01); *H01M 4/926* (2013.01)

(58) Field of Classification Search
CPC .... H01M 4/9008; H01M 4/923; H01M 4/926; C08K 3/08; C08K 5/372; B01J 31/123; B01J 37/0219; B01J 2531/828; C08L 25/18; C08L 2312/00

USPC ............................................. 525/199; 521/25
See application file for complete search history.

(56) References Cited

FOREIGN PATENT DOCUMENTS

| FR | 2982173 A1 * | 5/2013 | ............ B01J 31/123 |
|---|---|---|---|
| FR | 2982264 A1 * | 5/2013 | ............ B01J 31/123 |

OTHER PUBLICATIONS

Ferrandez et al. "Pt Particles Functionalized on the Molecular Level as New Nanocomposite Materials for Electrocatalysis", Langmuir 2012, 28, 17832-17840, pubs.acs.org/Langmuir (Year: 2012).*
Ferrandez et al. "Chemical Functionalization of Carbon Supported Metal Nanoparticles by Ionic Conductive Polymer via the "Grafting From" Method", Chem. Mater. 2013, 25, 3797-3807, pubs.acs.org/cm (Year: 2013).*
International Search Report for International Application No. PCT/FR2017/052245, dated Nov. 7, 2017.
Written Opinion for International Application No. PCT/FR2017/052245, dated dated Nov. 7, 2017.
Preliminary French Search Report for Application No. 16 57828, dated Feb. 10, 2017.
A.Ferrandez et al.: "Chemical Functionalization of Carbon Supported Metal Nanoparticles by Ionic Conductive Polymer via the "Grafting From" Method", Chemistry of Materials, vol. 25, n°19, Oct. 2013, pp. 3797-3807.
A.Ferrandez et al.: "Pt Particles Functionalized on the Molecular Level as New Nanocomposite Materials for Electrocatalysis", Langmuir, vol. 28, n°51, Dec. 2012, pp. 17832-17840.
U.S. Appl. No. 16/078,955 entitled "Method for Preparing Proton-Conducting Particles Suitable for Catalysing Oxygen Reduction or Hydrogen Oxidation by Grafting Specific Proton-Conducting Polymers to the Surface of Same," filed Aug. 22, 2018.
U.S. Appl. No. 16/089,240 entitled "Method for Preparing Proton-Conducting Platinum Particles with a Large Active Surface Area and Surface-Grafted with Specific, Proton-Conducting Polymers," filed Sep. 27, 2018.

* cited by examiner

PARTICLES SUITABLE FOR CATALYZING OXYGEN REDUCTION OR HYDROGEN OXIDATION AND BEING PROTON-CONDUCTING BY GRAFTING SPECIFIC PROTON-CONDUCTING FLUORINATED POLYMERS TO THE SURFACE THEREOF

CROSS-REFERENCE TO RELATED APPLICATIONS

This is a National Stage application of PCT international application PCT/FR2017/052245, filed on Aug. 18, 2017, which claims the priority of French Patent Application No. 16 57828, filed Aug. 19, 2016, both of which are incorporated herein by reference in their entirety.

TECHNICAL FIELD

The present invention relates to a particle preparation method for preparing particles that are suitable for catalysing oxygen reduction or hydrogen oxidation, these particles being, in addition, proton-conducting thanks to a functionalisation of the said particles with specific proton-conducting organic fluorinated polymers, the said particles providing the means, upon being incorporated into fuel cell electrodes, to allow for operation at high current density, without the phenomenon of flooding of the said electrodes.

As a result, applications for these particles may be found in the development of electrode materials, in particular materials intended to be used in the composition and preparation of catalytic layers of electrodes for fuel cells, such as $H_2$/air cells or $H_2/O_2$ cells (known by the abbreviation PEMFC signifying "Proton Exchange Membrane Fuel Cell").

Thus, the present invention is placed in the field of fuel cells operating on the principle of oxidation of hydrogen and reduction of oxygen.

STATE OF THE PRIOR ART

A fuel cell of this type is an electrochemical generator, which converts chemical energy into electrical energy by means of two electrochemical reactions: an oxidation reaction at the anode of a fuel cell (hydrogen) combined with a reduction reaction at the cathode of an oxidising agent (air or oxygen).

Conventionally, this type of fuel cell includes a plurality of electrochemical cells connected in series, each cell comprising of two electrodes of opposite polarity separated by a proton exchange membrane acting as solid electrolyte, with this membrane ensuring the passage to the cathode of the protons formed, by electrochemical reaction, during the oxidation of the fuel at the anode.

The above-mentioned electrochemical reactions (oxidation and reduction) are brought about at the level of specific zones of the electrodes (referred to as active zones corresponding structurally to the catalytic layers) which form the junction between the diffusion layer (at the level whereof the delivery-supply of reagents takes place) of the electrodes and the membrane and, in order to occur, necessitate the use of catalysts, which conventionally, for PEMFC-type cells, consist of platinum particles.

Taking into account the costs involved in making use of a catalyst such as platinum, it is necessary to obtain the maximum possible catalytic surface for a given mass of metal, it being possible to achieve such an objective by using platinum particles of nanometric sizes (also known as platinum nanoparticles).

It is also necessary, in order for the electrochemical reactions to take place, that the platinum particles be in contact with both the fuel or oxidising agent (depending on whether the position involved is at the anode or the cathode), the proton conductor constituting the membrane and the electronic conductor that is used for making the electrode (this electronic conductor being conventionally a carbonaceous material), this contact zone being known by the term 'triple point', with the effectiveness of the electrode being greater the higher the number of triple points.

In other words, at these triple points, at the level of the platinum particles the following conditions are presented:
  a physical continuity with the electrolytic membrane, so as to ensure the conduction of $H^+$ protons;
  a physical continuity with the electronic conductor, so as to ensure the conduction of the electrons; and
  a physical continuity with the diffusion zone of the electrodes, so as to ensure the diffusion of the gases (oxygen or hydrogen for the PEMFC cells).

The maintenance over time of these triple points supposes that there is adherence to the integrity of the zones of contact between the various different elements that are involved in the forming of these triple points, which implies maintenance of the physical integrity of these various elements, in particular of the platinum particles.

However some studies have shown that it is possible to contribute, during operation of a cell, to a degradation of the platinum particles (thereby inducing a decrease in active surface area) either by means of the dissolution phenomena or the phenomena of increase in particle sizes (conventionally resulting from agglomeration phenomena).

These dissolution phenomena may occur with cells operating at very low pH (for example, a pH below 1) and high operating potentials at the cathode (for example, a potential greater than 1 V with respect to RHE (RHE signifying reversible hydrogen electrode)) it being possible for the dissolved platinum to be found either in the water formed during the operation of the cell or in the interior of the electrolytic membrane that is generally polymeric, which leads to the formation of inactive platinum nanocrystals there-within.

As for the phenomena of increase (in particle sizes), they may occur with cells whose platinum nanoparticles present a high mobility on the surface of the generally carbonaceous support, on which they are deposited, this mobility being dependent on the surface energy of the latter.

In order to circumvent these phenomena, high levels of platinum particle loading may be resorted to which however come with the disadvantages that this represents in terms of production costs, taking into account the extremely high price of platinum on the markets.

With a view to reducing the loading levels while also being able to access an effective active surface area, studies have focused on the optimisation of the membrane-electrode (herein, comprising platinum particles) assemblies.

Thus, it has been proposed to juxtapose, by means of very close contact, the various elements (platinum particles, electrical conductor and electrolyte) necessary for the creation of triple points, it being possible for this juxtaposition to consist of the following:
  mixing platinum particles with carbon powder (which fulfils the role of electrical conductor) and impregnating the assembly with the electrolyte, so as to ensure better contact with the membrane;

depositing platinum particles by means of thin film deposition techniques (such as electrodeposition or spraying by physical means), which makes it possible to deposit platinum in low concentrations while also maintaining a very high level of catalytic activity.

However, the assemblies resulting from these techniques are fragile on account of the weak bonds involved in juxtaposing the constituent elements of these assemblies, which does not serve the purpose of preventing the phenomena of degradation due to the migration of the platinum particles bringing about, as a result, a decrease in the useful life of these assemblies.

Moreover, the issue of obtaining a maximum voltage also arises, particularly in respect of high current density related considerations.

In theory, the maximum voltage of a single cell of a proton exchange membrane fuel cell (PEMFC) is of the order of 1.23 V. However, this voltage is that corresponding to a state of equilibrium because it results from the calculation based on the thermodynamic potential of the electrochemical half-reactions at the electrodes and represents a reality only for a system through which no current passes, hence the term open circuit voltage (OCV). During closing of the circuit and therefore of the operation of the cell, various phenomena come into play thereby inducing a loss of voltage, which phenomena can be viewed on a polarisation curve, an example of a conventional polarisation curve being shown in FIG. 1 appended herewith in the annex, such a curve illustrating the evolution of the voltage E as a function of the current density D, this curve being divided into three parts: a first part referred to as activation part, a second part referred to as resistance part, and a third part referred to as diffusion part (respectively denoted as a, b and c in FIG. 1).

The first part, at low current densities, corresponds to a domain where activation over-voltage spikes constitute the predominant phenomenon.

Activation over-voltage spikes are representative of the reaction kinetics. In order to initiate a chemical reaction, and more particularly an electrochemical reaction, it is necessary to cross an activation barrier, which could be higher or lower. In a PEMFC fuel cell, this barrier is relatively high, in particular at the cathode, where the dioxygen reduction reaction is based. Given that the limiting reaction is this dioxygen reduction reaction, the anodic contribution may be, as a first approximation, neglected. The catalyst is targeted at reducing the activation barrier while also enabling the selectivity of the reaction.

The second part corresponding to the linear part of the curve illustrates a domain where the ohmic drop is the predominant phenomenon. During the operation of the battery, the ionic and electronic transfer resistances generate voltage losses. The ohmic losses responsible for the release of heat due to the Joule effect lead to a significant drop in efficiency. The ohmic drop is found to originate at the level of the electrodes (in terms of electrical resistance and proton resistance), the electrode-membrane interfaces (in terms of electrical resistance and proton resistance), and the membranes (in terms of proton resistance).

The resistances of the electrodes and the membrane obey Ohm's law of the type U=RI, hence the linear relationship in the zone of intermediate current densities.

Finally, the third part, in the zone of high current densities, corresponds to the inflected part of the curve. In this zone, the performances are essentially dependent on the phenomena of delivery-supply of reagents.

Indeed, at high current densities, a number of electrochemical reactions come into play, thus necessitating the delivery-supply of a large quantity of active material (whether they be protons, electrons, or oxygen in the case of the cathode). At the cathode, the oxygen is distributed by bipolar plates before passing through the diffusion layer of the electrode and migrating through the catalytic layer of the electrode. The oxygen delivery rate therefore depends on the ability of the oxygen to diffuse through all of these materials. When the supply of oxygen no longer covers this demand, the electrochemical reactions are no longer possible and the power decreases abruptly.

Moreover, in this zone of high current densities, the large number of reactions leads to the formation of a large quantity of water at the cathode. This water is formed on the surface of the catalytic particles, for example the platinum particles, and it therefore becomes necessary to evacuate the water in order to make the surface accessible to new molecules of oxygen. In the contrary case, a film of water is formed on the surface of the catalytic particles, causing flooding of the electrodes.

In the light of the above-mentioned problems, the authors of the present invention have therefore set themselves the objective of providing a new method that in addition would provide the ability to obtain particles which, upon being incorporated into a fuel cell, would make it possible to obtain an improvement in the electrochemical properties of the fuel cell and, in particular, upon being incorporated, within the fuel cell electrodes, to allow for operation at high current densities without the phenomenon of flooding of the said electrodes.

DETAILED DESCRIPTION OF THE INVENTION

Thus, the invention relates to a particle preparation method for preparing particles comprising of a material that is suitable for catalysing oxygen reduction or hydrogen oxidation, the said particles being grafted by grafts consisting of at least one polymer comprising at least one styrene repeating unit that bears at least one proton-conducting group, optionally in the form of a salt, the said method including:

a) a polymer preparation step for preparing at least one polymer by atom transfer radical polymerisation (ATRP):
of a fluorinated styrenic monomer optionally bearing at least one proton-conducting group, optionally in the form of a salt; and
optionally, of a non-fluorinated styrenic monomer bearing at least one proton-conducting group, optionally in the form of a salt;
with an ATRP initiator corresponding to the following formula (I):

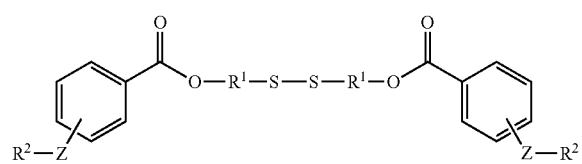

in which:
the groups $R^1$ represent, independently of one another, an organic spacer group;
the groups Z represent, independently of one another, a single bond or an organic spacer group;

the groups $R^2$ represent, independently of one another, a halogen atom;

the resulting polymer corresponding to the following formula (II):

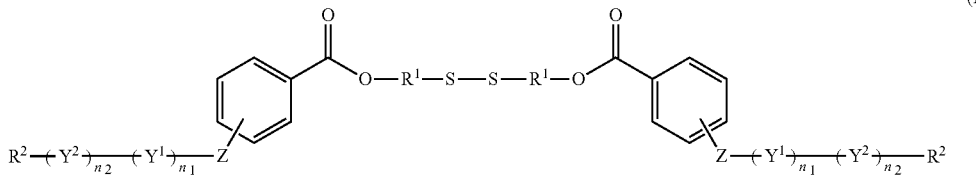

in which:

$Y^1$ corresponds to the repeating unit resulting from the polymerisation of the fluorinated styrenic monomer, optionally bearing at least one proton-conducting group, optionally in the form of a salt, and $n_1$ corresponds to the number of repetitions of the repeating unit placed within parentheses, this number of repetitions being a positive integer that is at least equal to 2;

$Y^2$ corresponds to the repeating unit resulting from the polymerisation of the non-fluorinated styrenic monomer bearing at least one proton-conducting group, optionally in the form of a salt, and $n_2$ corresponds to the number of repetitions of the repeating unit placed within parentheses, this number of repetitions being equal to 0 or being a positive integer that is at least equal to 2;

$R^1$, $R^2$ and Z being as defined here above;

b) when the repeating unit resulting from the polymerisation of the fluorinated styrenic monomer does not bear at least one proton-conducting group, optionally in the form of a salt, an introduction step for introducing on to this repeating unit at least one proton-conducting group, optionally in the form of a salt, the repeating unit $Y^1$ thus corresponding henceforth to a fluorinated styrene repeating unit bearing at least one proton-conducting group, optionally in the form of a salt;

c) a contacting step of placing in contact the particles comprising of a material that is suitable for catalysing oxygen reduction or hydrogen oxidation with the polymer obtained in a) or, as the case may be, in b), by which means the grafted particles are obtained by grafts having the following formula (III):

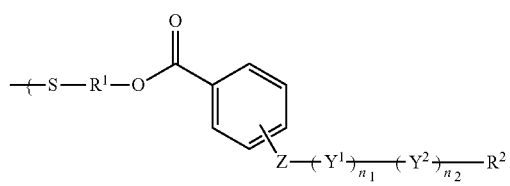

the curly bracket indicating the location at which the grafts are bound in a covalent manner, to the particles, and the $R^1$, $R^2$, Z, $Y^2$, $n_1$ and $n_2$ being as defined here above and $Y^1$ constitutes a fluorinated styrene repeating unit bearing at least one proton-conducting group, optionally in the form of a salt.

In particular, the groups $R^1$ may be identical to one another, just as the groups Z may be identical to one another and the groups $R^2$ may be identical to one another.

With regard to the group $Y^1$, the latter, for the step a), corresponds to a repeating unit resulting from the polymerisation of a fluorinated styrenic monomer optionally bearing at least one proton-conducting group, optionally in the form of a salt, which includes two possible cases:

the case wherein $Y^1$ is a repeating unit resulting from the polymerisation of a fluorinated styrenic monomer bearing at least one proton-conducting group, optionally in the form of a salt, which means that step b) will not be necessary;

the case wherein $Y^1$ is a repeating unit resulting from the polymerisation of a fluorinated styrenic monomer not bearing at least one proton-conducting group, optionally in the form of a salt, which means that step b) will be necessary.

For the outcome resulting from the step b) and for the step c), the group $Y^1$ corresponds to a fluorinated styrene repeating unit bearing at least one proton-conducting group, optionally in the form of a salt, with this repeating unit corresponding directly to that of the step a) (when, from the step a), $Y^1$ corresponds to a repeating unit resulting from the polymerisation of a fluorinated styrenic monomer bearing at least one proton-conducting group, optionally in the form of a salt), or corresponding to the repeating unit from the step a) transformed during the step b) by the introduction of at least one proton-conducting group, optionally in the form of a salt.

Before going into further detail in this present description, it is appropriate to specify the following definitions.

The term "polymer", for the scope and purposes of the invention, is conventionally understood to refer to a compound constituted by the linking of one or more repeating units (the term 'copolymer' may be used when the polymer comprises, at the same time, both a repeating unit $Y^1$ and a repeating unit $Y^2$).

The term "repeating unit", for the scope and purposes of the invention, is conventionally understood to refer to a divalent organic group (that is to say a bridging group) that is derived from a monomer after polymerisation thereof.

The term "polymerisation of the ATRP type", is understood to refer to a radical polymerisation by transfer of atoms (ATRP corresponding to the abbreviation of the accepted terminology "Atom Transfer Radical Polymerisation"). The mechanism of this type of polymerisation will be explained in greater detail here below.

Thus, thanks to the implementation of the method of the invention, it is therefore possible to obtain particles comprising of a material that is suitable for catalysing oxygen reduction or hydrogen oxidation, which are covalently grafted via a residue of the ATRP initiator compound by specific proton-conducting styrenic polymers, this making it possible, when these particles are intended to be used in the making of electrodes (in particular in the composition and preparation of catalytic layers thereof), to ensure good performance at high current densities, thanks in particular to the presence in the proton-conducting polymer of fluorinated styrene repeating units, which ensure a hydrophobic character that will prevent, in particular, the phenomenon of flooding of the electrodes responsible for causing the degradation of the relevant properties for high current densities.

As mentioned here below, the method of the invention includes a polymer preparation step for preparing at least one polymer by atom transfer radical polymerisation ATRP of a fluorinated styrenic monomer optionally bearing at least one proton-conducting group, optionally in the form of a salt and, optionally, a non-fluorinated styrenic monomer bearing at least one proton-conducting group, optionally in the form of a salt, with an ATRP initiator corresponding to the formula (I) as defined here above.

According to one particular embodiment of the invention, the preparation step involves a fluorinated styrenic monomer, which does not bear at least one proton-conducting group, optionally in the form of a salt (which signifies, in other words, that the method of the invention will additionally include the implementation of the step b)) and, optionally, a non-fluorinated styrenic monomer bearing at least one proton-conducting group, optionally in the form of a salt.

This polymer preparation step is governed by the mechanisms of the ATRP process, which operates on the principle of the reversible and rapid formation of species referred to as "dormant species" by creating a covalent bond with a reactive radical species.

The initiator compound for an ATRP type polymerisation having the formula (I) is a compound comprising at least one group that is capable of initiating the ATRP process, that is to say a group that has the ability to be cleaved at a bond in order to form a first radical species and a second radical species, the first radical species reacting subsequently, with a first carbon atom bearing a double bond belonging to the one or more monomer(s), the second radical species binding to a second atom found to be opposite the first carbon atom that bears the double bond.

In other words, this mechanism may be summarised in accordance with the following reaction scheme:

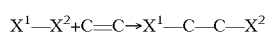

$X^1$—$X^2$ corresponding to the abovementioned initiator with $X^1$ corresponding to the first species and $X^2$ corresponding to the second species, the species $X^1$—C—C—$X^2$ being a dormant species, that can grow by successive additions of monomers on the free radicals, as in a conventional radical polymerisation, the free radicals being created by the departing of the group $X^2$, which subsequently binds after insertion of the monomer at the end of the polymer chain, the latter continuing to constitute a dormant species that can continue to grow as long as there continue to remain monomers in the polymerisation medium.

For the sake of simplicity, we have represented here above only the double bond of the monomer.

In addition, the initiator compound having the formula (I) used in the context of this polymer preparation step comprises at least one group that is capable of grafting onto the surface of the aforementioned particles, that is to say, a group that is capable of reacting with the surface of the said particles so as to form a covalent bond, by which means there continues to remain a residue of this initiator covalently bound to the surface of the said particles.

For the initiator compounds having the formula (I), the group that is capable of initiating a polymerisation of the ATRP type is the group —Z—$R^2$ mentioned here above, this group having the ability to be cleaved homolytically, at the carbon-halogen bond in order to form two radical species, a first carbon radical species (which may be symbolised by —C.) and a second radical species consisting of a halogen radical (which may be symbolised by $R^2$.), the first species reacting with one end of the double bond of the monomer and the second species reacting with the opposite end of the double bond. In the formula (I), this group —Z—$R^2$ being represented as intersecting a carbon-carbon bond of the phenyl group, this signifies that it may be bound to any one of the carbon atoms of this phenyl group and, in particular may be located in the para-position relative to the —COO— group.

The group that is capable of being grafted to the surface of particles corresponds, for this type of compounds, to the disulfide group —SS—.

For the compounds having the formula (I), the groups $R^1$ and the groups Z may represent, independently of one another, an alkylene group, for example an ethylene group or a methylene group.

More specifically, the groups $R^1$ may be an ethylene group and the groups Z may be a methylene group.

When the groups Z are a single bond, this signifies, in other words, that $R^2$ is directly bound to any one of the carbon atoms of the phenyl group.

For the compounds having the formula (I), the groups —Z—$R^2$ may be located in the para-position relative to the groups —COO—.

A particular ATRP initiator compound that falls within the class of compounds having the formula (I) is a compound having the following formula (IV):

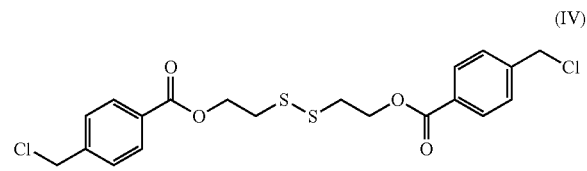 [SMILES: O=C(OCCSSCCOC(=O)c1ccc(CCl)cc1)c1ccc(CCl)cc1]

The compounds having the formula (I) may be synthesised by a nucleophilic substitution reaction between an acyl halide compound and an alcoholic compound, this reaction being based on the formation of an alkoxide (or alcoholate) from the deprotonation of the alcoholic compound in basic medium (for example, in the presence of triethylamine), the alkoxide thus formed reacting on the acyl chloride in order to form the initiator compound, generally at a temperature of the order of 0° C., in a manner so as to ensure the stability of the alkoxide.

By way of example, when it is a matter of preparing a compound having the formula (IV) mentioned here above, the acylation reaction can take place between the compound 2-hydroxyethyldisulphide and the compound 4-chloromethylbenzoyl chloride according to the following reaction scheme:

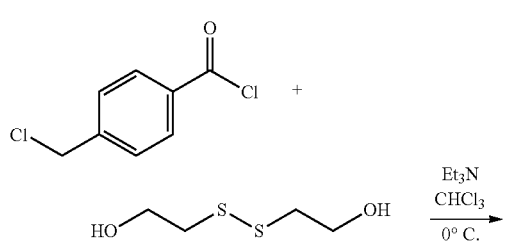

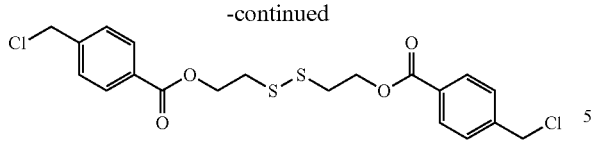

It being possible for this reaction to be performed using chloroform as organic solvent.

The fluorinated styrenic monomer that is able to be used in the context of the polymer preparation step may be a monomer corresponding to the following formula (V):

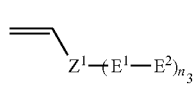

(V)

$Z^1$ corresponds to a fluorinated phenylene group; and
$E^1$ corresponds to a single bond or an organic spacer group;
$E^2$ corresponds to a proton-conducting group, optionally in the form of a salt, such as a sulfonic acid group, a phosphonic acid group or a carboxylic acid group;
$n_3$ is equal to 0 or 1.

When $n_3$ is equal to 0, this signifies that $-E^1-E^2$ does not exist and that the formula boils down to the following formula (VI):

(VI)

the vacant position left by the absence of $-E^1-E^2$ on the groups $Z^1$ being occupied by a fluorine atom on this group $Z^1$.

When $n_3$ is equal to 1, this signifies that $-E^1-E^2$ is present and that the formula may thus be condensed into the following formula (VII):

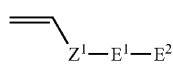

(VII)

According to one variant, $E^2$ may be bound directly to $Z^1$ and, more specifically, to a carbon atom of the fluorinated phenylene group, when $E^1$ is a single bond. For example, $E^2$ may be located in the para-position on this fluorinated phenylene group.

According to another variant, $E^2$ may be bound to $Z^1$ via an organic spacer group $E^1$, itself being bound to a carbon atom of the fluorinated phenylene group, for example, in the para-position on this fluorinated phenylene group.

$E^1$, when it is an organic spacer group, may be an alkylene group, an —S— alkylene group or an —O-alkylene group (in the latter two cases, the S atom and the O atom are directly bound to the fluorinated phenylene group), the said alkylene groups may contain from 1 to 4 carbon atoms, such as a methylene group, an ethylene group, a propylene group, a butylene group.

More specifically, $E^1$, when it is an organic spacer group, may be an —O-propylene group having the following formula (VIII):

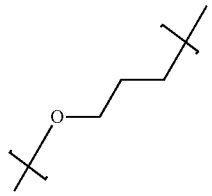

(VIII)

the curly bracket at the level of the oxygen atom indicating the location at which the oxygen atom is bound to the fluorinated phenylene group and the curly bracket at the last carbon atom indicating that this carbon atom is bound to the group $E^2$.

Regardless of whether it is for the group $E^2$ (where $E^1$ is a single bond) or the group $E^1$ (where $E^1$ is an organic spacer group), these groups can occupy any one of the carbon atoms of the fluorinated phenylene group and in particular, the para-position.

Regardless of the variant that is selected, the fluorinated styrenic monomer may contain only fluorine atoms at the free carbon atoms of the phenylene ring.

An example of a fluorinated styrenic monomer is a monomer having the following formula (IX):

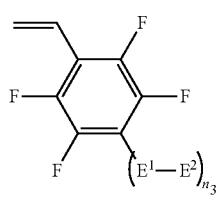

(IX)

wherein $E^1$, $E^2$, $n_3$ are as defined here above, with the particular feature thereof being that, when $n_3$ is equal to 0, the vacant position left by the absence of $-E^1-E^2$ is occupied by a fluorine atom.

Even more specifically, particular examples of fluorinated styrenic monomers are the monomers corresponding to the following formulas (X) and (XI):

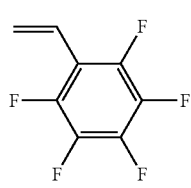

(X)

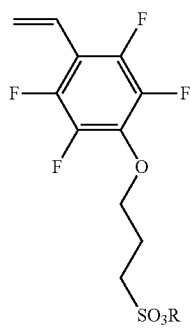

(XI)

wherein R is a hydrogen atom or a cation (for example, an alkali metal cation).

These monomers, where they are not available commercially, may be provided for by way of prior preparation by making use of conventional processes of synthesis in organic chemistry.

Thus, for example, when it comes to preparing a monomer having the formula (XI) following here below, the latter may be prepared by the reaction of a hydroxylated tetrafluorostyrene with, during an initial stage, a base in order to form a hydroxylate, which will react with a sultone compound (more specifically, 1,3-propanesultone) in order to form the aforementioned monomer, the mechanism of the reaction residing in a nucleophilic addition of the hydroxylate with the sultone compound thus causing a ring opening.

Where it is present, the non-fluorinated styrenic monomer may have the following formula (XII):

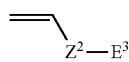

(XII)

wherein:
$Z^2$ is a phenylene group; and
$E^3$ corresponds to a proton-conducting group, optionally in the form of a salt, such as a sulfonic acid group, a phosphonic acid group or a carboxylic acid group.

A specific monomer responding to the definition provided here above is a styrenesulfonic acid monomer, for example in the form of a salt, such as a sodium salt (in which case it may be referred to as sodium styrenesulfonate monomer).

An example of this type of monomer is a monomer having the following formula (XIII):

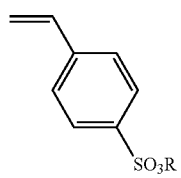

(XIII)

in which R is a hydrogen atom or a cation (for example, an alkali metal cation).

In addition to the presence of one or more monomers as defined here above, the polymer preparation step may be carried out, conventionally, in the presence of a metal salt (for example, a metal halide, such as a copper halide, like copper chloride) and an organic ligand.

It is specified that, the term 'organic ligand', is understood to refer to an organic compound comprising at least one lone pair that has the ability to go on to fill an electron vacancy of a metal element (in this instant, in our case, an electron vacancy on the metal element of the aforementioned salt) so as to form a metal complex.

By way of example, an appropriate organic ligand may be a compound belonging to the family of pyridine compounds, such as bipyridine.

The preparation step for preparing the polymer may be carried out, in addition, in an aprotic apolar solvent, such as a sulfoxide solvent, in particular when the polymerisation involves the use of a fluorinated styrenic monomer, of which the proton protecting group or groups are subsequently introduced during the step b), during a temperature and time period that is suitable for generating the polymerisation, for example, a temperature of 80° C.

By way of a variant, the polymer preparation step may be carried out, in addition, in a water/organic solvent mixture (for example, an alcoholic solvent) under the flow of an inert gas stream (such as an argon stream) during a period of time and temperature appropriate for generating the polymerisation.

In addition, this polymer preparation step may be followed by a hydrolysis step intended for protonating the proton conducting groups when they are present in the form of a salt (in other words, this step consists of replacing the cations of the salt with hydrogen atoms).

The average molar masses of the polymers obtained at the conclusion of the polymerisation step may range from 2000 to 1,000,000 g/mol, preferably from 50,000 to 500,000 g/mol.

Advantageously, when the polymer comprises at least one repeating unit resulting from the polymerisation of one or more non-fluorinated styrenic monomer(s), the proportion of the said repeating unit is less than that of the repeating unit resulting from the polymerisation of the one or more fluorinated styrenic monomer(s).

After the step a), the method includes, where appropriate, when the repeating unit resulting from the polymerisation of the fluorinated styrenic monomer does not bear at least one proton-conducting group, optionally in the form of a salt, an introduction step for introducing on to this repeating unit at least one proton-conducting group, optionally in the form of a salt, the repeating unit $Y^1$ thus corresponding henceforth to a fluorinated styrene repeating unit bearing at least one proton-conducting group, optionally in the form of a salt.

This proton-conducting group may be introduced directly on to the phenylene ring of the styrene repeating unit or that is via an organic spacer group, which signifies that the organic spacer group is directly bound to the phenylene ring and forms a bridge between the phenylene ring and the proton conducting group, possibly in the form of salts.

This introduction may be carried out by means of any appropriate chemical synthesis processes and routes.

Thus, by way of example, when the repeating unit is derived from the polymerisation of the pentafluorostyrene monomer and the proton conducting group meant to be introduced is a sulfonic acid group bound directly to the phenylene ring, the introduction step may comprise of the following operations:
  an operation of sulfurisation of the benzene ring consisting of a substitution of a fluorine atom by a group —SR with R representing a hydrogen atom or a cation, such as an alkali metal cation; and
  an operation of oxidation of the sulfide group in order to form a group —SO₃R with R being as defined here above.

More specifically, the sulfurisation operation may consist in reacting hydrated sodium hydrogen sulphide in dimethylsulfoxide, thus enabling the introduction of a group —S—Na, for example, in the para-position.

As for the operation of oxidation of the sulfide group, it can be carried out in the presence of an oxidant, such as oxygenated water.

By way of a variant, when the repeating unit is derived from the polymerisation of the pentafluorostyrene monomer and the proton conducting group to be introduced is a sulfonic acid group bound to an organic spacer group, the introduction step may comprise of the following operations:

an operation of sulfurisation of the benzene ring consisting of a substitution of a fluorine atom by a group —SR with R representing a hydrogen atom or a cation, such as an alkali metal cation;

an operation of nucleophilic addition of the group —SR on a sultone compound thus generating a ring opening, whereby there is formation of a group -$E^1$-$SO_3$R, with $E^1$ being an organic spacer group of the type —S-alkylene.

More specifically, it may be a reaction of nucleophilic addition of a sodium thiolate group on to a 1,3-propanesultone compound, thereby resulting in a ring opening and thus forming a group —S—$CH_2$—$CH_2$—$CH_2$—$SO_3$Na.

After the step a), if step b) is not necessary or after the step b), the method of the invention comprises a contacting step of placing in contact the particles comprising of a material that is suitable for catalysing oxygen reduction or hydrogen oxidation, with the polymer obtained in a) or, as the case may be, in b), by which means particles grafted with grafts having the following formula (III) are obtained:

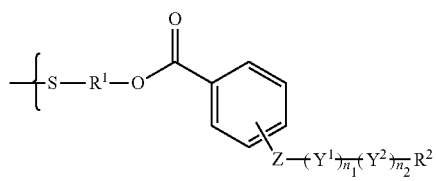

the curly bracket indicating the location at which the grafts are bound in a covalent manner, to the particles, and the $R^1$, $R^2$, Z, $Y^2$, $n_1$ and $n_2$ being as defined here above and $Y^1$ is a fluorinated styrene repeating unit bearing at least one proton-conducting group, optionally in the form of a salt, the group —Z—$(Y^1)_{n1}$—$(Y^2)_{n2}$—$R^2$, which intersects a carbon-carbon bond of the phenyl group, signifying that it can be bound to any one of the carbon atoms of the phenyl group.

It will be noted that the repeating units $Y^1$ and $Y^2$ may be distributed in a random manner, alternated manner, or sequential manner, which, in other words, signifies respectively that the repeating units $Y^1$ and $Y^2$ are distributed in a random manner in the copolymer, the repeating units $Y^1$ and $Y^2$ are alternated in the copolymer or indeed the repeating units $Y^1$ and $Y^2$ are distributed in the form of blocks (that is to say, a block of repeating units $Y^1$ and a block of repeating units $Y^2$) in the copolymer.

This step c) of contacting may comprise a dispersion operation of dispersing the aforementioned particles, for example, in an electrophilic solvent (such as an amine solvent, for example hexylamine) followed by a contacting operation of placing in contact the dispersion obtained with one or more polymers as defined here above under conditions that are sufficient so as to allow for the covalent grafting of the polymers prepared in a) or b).

The particles comprising of a material that is suitable for catalysing oxygen reduction or hydrogen oxidation may be metal particles, that is to say particles comprising one or more metallic elements (in which case, where there exist a plurality of metallic elements they are referred to as particles of metal alloy(s)).

Metal particles that are particularly suitable may be particles comprising a noble metal, such as platinum, ruthenium, palladium and mixtures thereof.

When the particles obtained according to the invention are intended to be used in PEM fuel cells, the metal particles are advantageously platinum particles.

Without being tied down by the theory, the polymer, in the presence of particles, will split into two organic residues by means of homolytic cleavage of the bond between the two sulfur atoms, the two residues consisting of radical species, the free electrons being located at the level of the sulfur atoms, these free electrons each associating with an electron present on the surface of the particles in order to form a covalent bond between the above-mentioned radical species and the particles via the sulfur atoms, it being possible for the resulting product to be represented schematically in the following manner:

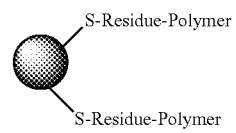

the full sphere corresponding to a particle, —S-Residue— corresponding to a residue of the ATRP initiator compound that forms a bridge between the particle and the polymer (respectively, a first polymer chain and a second polymer chain).

As regards the polymer, the proton-conducting group may be a sulfonic acid group —$SO_3$H, a carboxylic acid group —$CO_2$H or a phosphonic acid group —$PO_3H_2$, these groups possibly being present in the form of salts.

According to one particular embodiment of the invention, the method may relate to the preparation of particles grafted with a polymer that has no repeating unit $Y^2$, in which case the method may be formulated as being a particle preparation method for preparing particles comprising of a material that is suitable for catalysing oxygen reduction or hydrogen oxidation, the said particles being grafted with grafts consisting of at least one polymer comprising at least one styrene repeating unit bearing at least one proton-conducting group, optionally in the form of a salt, the said method including:

a) a polymer preparation step for preparing at least one styrenic polymer by atom transfer radical polymerisation (ATRP) of a fluorinated styrenic monomer optionally bearing at least one proton-conducting group, optionally in the form of a salt, with an ATRP initiator corresponding to the following formula (I):

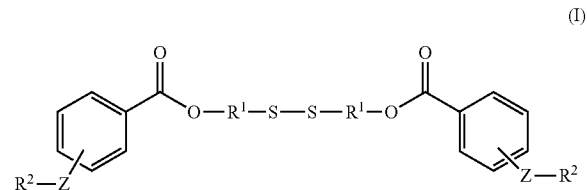

in which:
the groups $R^1$ represent, independently of one another, an organic spacer group;
the groups Z represent, independently of one another, a single bond or an organic spacer group;
the groups $R^2$ represent, independently of one another, a halogen atom;

the resulting polymer corresponding to the following formula (II'):

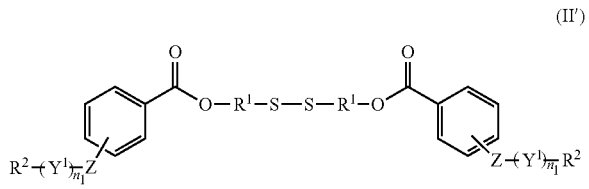

(II')

in which:

Y$^1$ corresponds to the repeating unit resulting from the polymerisation of the fluorinated styrenic monomer optionally bearing at least one proton-conducting group, optionally in the form of a salt and n$_1$ corresponds to the number of repetitions of the repeating unit placed within parentheses, this number of repetitions being a positive integer that is at least equal to 2;

R$^1$, R$^2$ and Z being as defined here above;

b) when the repeating unit resulting from the polymerisation of the fluorinated styrenic monomer does not bear at least one proton-conducting group, optionally in the form of a salt, an introduction step for introducing on to this repeating unit at least one proton-conducting group, optionally in the form of a salt, the repeating unit Y$^1$ thus corresponding henceforth to a fluorinated styrene repeating unit bearing at least one proton-conducting group, optionally in the form of a salt;

c) a contacting step of placing in contact the particles comprising of a material that is suitable for catalysing oxygen reduction or hydrogen oxidation with the polymer obtained in a) or, as the case may be, in b), by which means the grafted particles are obtained by grafts having the following formula (III'):

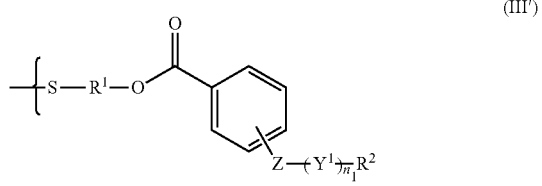

(III')

the curly bracket indicating the location at which the grafts are bound in a covalent manner, to the particles, and the R$^1$, R$^2$, Z, n$_1$ and n$_2$ being as defined here above and Y$^1$ is a fluorinated styrene repeating unit bearing at least one proton-conducting group, optionally in the form of a salt.

Prior to the step a) and/or the step b) and/or the step c), the method of the invention may also include a step of preparation of the said particles, that is to say particles comprising of a material that is suitable for catalysing oxygen reduction or hydrogen oxidation.

When the particles are metal particles, the preparation of the latter may consist in reducing a metal salt by causing the latter to react with a reducing agent.

For example, when the metal particles are platinum particles, they can be prepared by reduction of a platinum salt with a reducing agent.

The platinum salt may be a platinum halide salt, optionally hydrated, such as H$_2$PtCl$_6$.6H$_2$O.

The reducing agent may be a metal hydride, and more particularly a metal borohydride, such as sodium borohydride (NaBH$_4$).

The preparation may be carried out in an emulsion type medium such as "water-in-oil" emulsion ("water-in-oil" corresponding to the accepted terminology), it being possible for the oil to correspond to a hydrocarbon compound, such as hexane.

From a practical point of view, the preparation of platinum particles in such a medium can be carried out by effectively implementing the following operations:

a contacting operation of placing in contact a platinum salt (for example, H$_2$PtCl$_6$—H$_2$O) dissolved in advance in water, with a medium comprising an oil and optionally a dispersing agent (for example, tetraethylglycoldodecyl ether);

an operation of adding of a reducing agent to the mixture resulting from the preceding operation, carried out one or more times, at the end of which the resulting admixture is agitated for a sufficient period of time until achieving the complete cessation of any off-gassing (this cessation indicating that the reduction reaction has been completed).

The final mixture thus comprises platinum particles, it being possible for this mixture to be used as is for the operational implementation of the step c) (it could thus be the said that step c) is carried out in situ).

By way of a variant, the final mixture may be treated (for example, by means of filtration) in a manner so as to isolate the platinum particles obtained, the latter being intended to be used for the operational implementation of the step c).

In addition to the fact that the particles obtained according to the method of the invention are functionalised with polymers as defined here above, these particles can also be bound (for example, also, covalently) to a carbonaceous material (which can be assimilated into a carbon support), such as graphite, carbon black, carbon fibres, carbon tubes (such as carbon nanotubes), graphene.

When the particles are bound to a carbonaceous material, the latter may become involved at different times during the operational implementation of the method of the invention.

According to a first embodiment, the particles may be used already bound to a carbonaceous material during the operational implementation of the step c).

These particles already bound to a carbonaceous material may be prepared in advance of the step of operational implementation of the step c).

In this case, the method of the invention may include, prior to the implementation of the step c), a particle preparation step of preparing particles comprising of a material that is suitable for catalysing oxygen reduction or hydrogen oxidation, the particles being already bound to a carbonaceous material.

According to a first variant, where the particles are metal particles, the preparation of the latter may include:

a reduction operation of reducing a metal salt by causing the latter to react with a reducing agent, by which means the metal particles are obtained;

a contacting operation of placing in contact the medium resulting from the preceding operation with the carbonaceous material intended to be bound to the particles, by which means the metal particles bound to a carbonaceous material are obtained.

For example, when the metal particles are platinum particles, the reduction step consists in reducing a platinum salt with a reducing agent.

The platinum salt may be a platinum halide salt, optionally hydrated, such as $H_2PtCl_6 \cdot 6H_2O$.

The reducing agent may be a metal hydride, and more particularly a metal borohydride, such as sodium borohydride ($NaBH_4$).

The preparation may be carried out in an emulsion type medium such as "water-in-oil" emulsion ("water-in-oil" corresponding to the accepted terminology), it being possible for the oil to correspond to a hydrocarbon compound, such as hexane.

From a practical point of view, the preparation of platinum particles in such a medium, prior to the placing in contact thereof with the carbonaceous material, can be carried out by effectively implementing the following operations:

- a contacting operation of placing in contact a platinum salt (for example, $H_2PtCl_6$—$H_2O$) dissolved in advance in water, with a medium comprising an oil and optionally a dispersing agent;
- an operation of adding of a reducing agent to the mixture resulting from the preceding operation, at the end of which the resulting admixture is agitated for a sufficient period of time until achieving the complete cessation of any off-gassing (this cessation indicating that the reduction reaction has been completed), by which means a mixture comprising the platinum particles is obtained.

This mixture comprising the platinum particles is subsequently placed in contact with the carbonaceous material, preferably under ultrasound, by which means, at the conclusion of this contacting operation, a final mixture comprising the platinum particles bound to the carbonaceous material is obtained, it being possible for this mixture to be used as is for the operational implementation of the step c).

By way of a variant, the final mixture may be treated (for example, by means of filtration) in a manner so as to isolate the platinum particles obtained, the latter being intended to be used for the operational implementation of the step c).

According to a second variant, when the particles are metal particles, the preparation may consist of a reduction step of reducing by means of a reducing agent of a mixture comprising a metal salt and a carbonaceous material, by causing the latter to react with a reducing agent, by which means the metal particles bound to the carbonaceous material are obtained.

For example, when the metal particles are platinum particles, the reduction step consists in reducing a platinum salt with a reducing agent.

The platinum salt may be a platinum halide salt, optionally hydrated, such as $H_2PtCl_6 \cdot 6H_2O$.

The reducing agent may be a metal hydride, and more particularly a metal borohydride, such as sodium borohydride ($NaBH_4$).

Even more specifically, the preparation of platinum particles bound to a carbonaceous material can be carried out by effectively implementing the following operations:

- a contacting operation of placing in contact a basic aqueous solution (for example, lithium carbonate based solution) of a platinum salt (for example, $H_2PtCl_6$—$H_2O$) with the carbonaceous material;
- an operation of adding of a reducing agent to the mixture resulting from the preceding operation, at the end of which the resulting admixture is agitated for a sufficient period of time until a mixture comprising the platinum particles bound to the carbonaceous material is obtained.

This mixture may be treated (for example, by means of filtration) in a manner so as to isolate the platinum particles obtained, the latter being intended to be used for the operational implementation of the step c).

According to a second embodiment, the particles can be used, during the implementation of the step c), in a form that is not bound to the carbonaceous material, which implies, in this case, that the method of the invention includes, after the step c), a contacting step of placing in contact the particles obtained at the end of the step c) with the carbonaceous material (hereinafter referred to as step c'), by which means the said particles are bound at the conclusion of this step to the carbonaceous material.

More specifically, this step of bringing about contact with the carbonaceous material may be carried out under ultrasound, in a manner such as to effectuate the collision of the particles with the carbonaceous material in order to form a bond between these particles and the material.

For the first embodiment (that is to say, the embodiment, in which the particles are used already bound to a carbonaceous material prior to the implementation of the step c), the step c) may be carried out by means of the following operations:

- a dispersion operation of bringing about dispersion of the particles in an electrophilic organic solvent, such as an amine solvent (for example hexylamine), this type of solvent contributing to ensuring good stabilisation of the dispersion, by which means a dispersion of particles comprising of a material that is suitable for catalysing oxygen reduction or hydrogen oxidation bound to a carbonaceous material is obtained;
- a contacting operation of placing in contact the aforementioned dispersion with a polymer as defined here above, preferably dissolved in advance in water;
- optionally, a washing operation of washing the particles obtained, for example, by means of cycles of precipitation/centrifugation, in a manner so as to eliminate traces of initiator compound that remain unreacted.

For the second embodiment (that is to say the embodiment, for which the method of the invention includes, after the step c), a contacting step of placing in contact the particles obtained at the end of the step c) with the carbonaceous material (hereinafter referred to as step c'), by which means the said particles are bound at the conclusion of this step to the carbonaceous material), the method of the invention may include:

- a particle preparation step of preparing particles comprising of a material that is suitable for catalysing oxygen reduction or hydrogen oxidation;
- a step c), as defined here above, of placing in contact, in the synthesis medium of the preceding step, of a polymer as defined here above with the particles obtained previously;
- a contacting step of placing in contact the particles resulting from the step c) with a carbonaceous material, in a manner so as to obtain particles bound to a carbonaceous material.

When the particles are metal particles, the step of preparation of the latter may include a reduction operation of reducing a metal salt by causing the latter to react with a reducing agent, by which means the metal particles are obtained.

For example, when the metal particles are platinum particles, the reduction step consists in reducing a platinum salt with a reducing agent.

The platinum salt may be a platinum halide salt, optionally hydrated, such as $H_2PtCl_6 \cdot 6H_2O$.

The reducing agent may be a metal hydride, and more particularly a metal borohydride, such as sodium borohydride ($NaBH_4$).

The preparation may be carried out in an emulsion type medium such as "water-in-oil" emulsion ("water-in-oil" corresponding to the accepted terminology), it being possible for the oil to correspond to a hydrocarbon compound, such as hexane.

From a practical point of view, the preparation of platinum particles in such a medium, prior to the placing in contact thereof with the initiator compound and then the carbonaceous material, can be carried out by effectively implementing the following operations:
- a contacting operation of placing in contact a platinum salt (for example, $H_2PtCl_6$—$H_2O$) dissolved in advance in water, with a medium comprising an oil and optionally a dispersing agent;
- an operation of adding of a reducing agent to the mixture resulting from the preceding operation, at the end of which the resulting admixture is agitated for a sufficient period of time until achieving the complete cessation of any off-gassing (this cessation indicating that the reduction reaction has been completed), by which means a mixture comprising the platinum particles is obtained.

The step c) of bringing about contact may be carried out by means of the introduction of the polymer in an aqueous medium, in a manner so as to not disturb the synthesis medium of the particles.

The step of placing in contact with the carbonaceous material may be carried out by means of the introduction of the latter directly into the synthesis medium and subjecting of the resulting mixture to a treatment with ultrasound, in a manner such as to cause the binding of the carbonaceous material to the particles.

This embodiment makes it possible to perform a monotopic synthesis of particles bound to a carbonaceous material and grafted on to the polymers as defined here above via the residues of the initiator compound for an ATRP process.

According to a third embodiment, the method of the invention includes a particle preparation step of preparing particles of a material suitable for catalysing oxygen reduction or hydrogen oxidation bound to a carbonaceous material, this step being carried out in a manner concomitant with the step c).

In this case, when the particles are metal particles, the preparation of the latter carried out concomitantly with the step c) includes:
- a contacting step of placing in contact a metal salt, of a carbonaceous material, in a basic medium, with a polymer as defined here above in the step a);
- a step of adding of a reducing agent to the mixture resulting from the preceding step, by which means the resultant particles that are in conformity with the invention are derived, that is to say metal particles bound to a carbonaceous material and to polymers as defined here above;
- optionally an isolation step of isolating the particles thus obtained.

For example, when the particles are platinum particles, the preparation of the latter carried out concomitantly with the step c) includes:
- a contacting step of placing in contact a platinum salt (for example, $H_2PtCl_6$—$H_2O$), of a carbonaceous material (such as carbon black) with a basic aqueous solution (for example, lithium carbonate based solution) and with a polymer as defined for the step a);
- a step of adding of a reducing agent to the mixture resulting from the preceding step, at the end of which the resulting admixture is agitated for a sufficient period of time until a final mixture comprising the platinum particles bound to the carbonaceous material and to the aforementioned polymer is obtained.

Regardless of the embodiment that is undertaken, the rate of grafting of the polymer(s) (expressed as mass percentage of polymer in the particles) may range from 1 to 25% by weight.

The particles that can be obtained by the method of the invention are particles comprising of a material that is suitable for catalysing oxygen reduction or hydrogen oxidation, the said particles being grafted with grafts having the following formula (III):

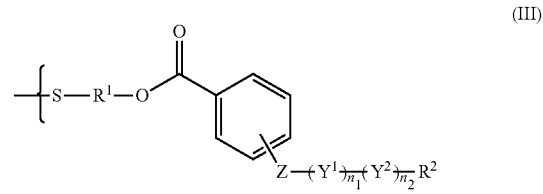

(III)

the curly bracket indicating the location at which the grafts are bound in a covalent manner, to the particles, and the $R^1$, $R^2$, $Z$, $Y^2$, $n_1$ and $n_2$ being as defined here above and $Y^1$ is a fluorinated styrene repeating unit bearing at least one proton-conducting group, optionally in the form of a salt, the group —$Z$—$(Y^1)_{n1}$—$(Y^2)_{n2}$—$R^2$, which intersects a carbon-carbon bond of the phenyl group, which signifies that it can be bound to any one of the carbon atoms of the phenyl group.

The possible variations provided here above for the definitions of $R^1$, $Z$, $Y^1$, $Y^2$, $R^2$, $n_1$ and $n_2$ in the context of the description of the method can be used for the definition of the particles of the invention.

In particular, the groups $R^1$ may be identical to one another, just as the groups $Z$ may be identical to one another and the groups $R^2$ may be identical to one another. More specifically, $R^1$ and $Z$ represent an alkylene group and $R^2$ a halogen atom, such as chlorine.

The group —$Z$—$(Y^1)_{n1}$—$(Y^2)_{n2}$—$R^2$ may also be in para-position relative to the group —CO—O—.

$Y^1$ may represent a repeating unit having the following formula (XIV):

(XIV)

with $Z^1$, $E^1$, $E^2$ and $n_3$ being as defined here above;

and more specifically, a repeating unit having the following formula (XV):

(XV)

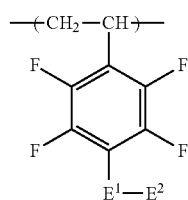

with $E^1$ and $E^2$ being as defined here above;

and even more specifically, a repeating unit corresponding to one of the following formulas (XVI) to (XVIII):

(XVI)

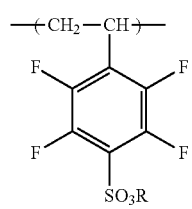

(XVII)

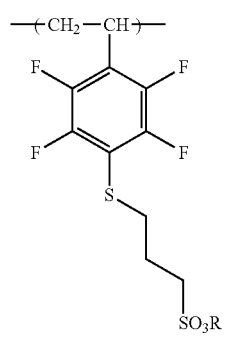

(XVIII)

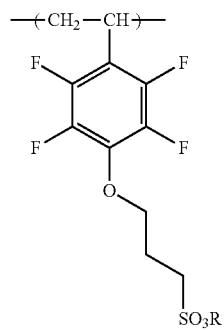

with R being as defined here above.

When $Y^2$ exists, $Y^2$ may represent a repeating unit resulting from the polymerisation of a styrenic monomer having the formula (XII) or (XIII) mentioned above, such as a sodium styrene sulfonate monomer, and more specifically, a repeating unit corresponding to one of the following formulas (XIX) and (XX):

(XIX)

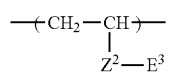

(XX)

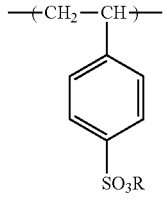

with $Z^2$, $E^3$ and R being as defined here above.

The particles may be, in particular, platinum particles.

In particular, $n_2$ may be equal to 0, in which case the particles are grafted with grafts having the following formula (XXI):

(XXI)

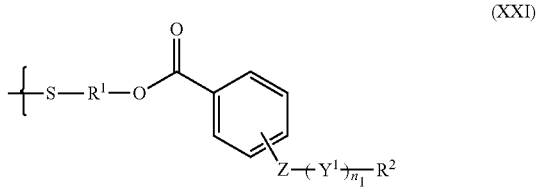

with $R^1$, Z, $Y^1$, $R^2$ and $n_1$ being as defined here above.

Specific particles in accordance with the invention may be particles, for example of platinum, that are grafted with grafts having the following formulas:

(XXII)

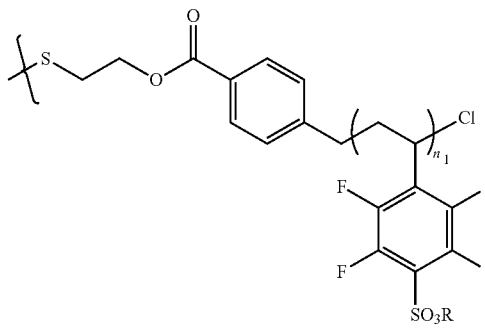

(XXIII)

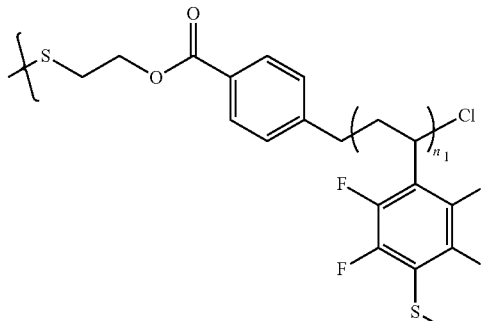

-continued (XXIV)

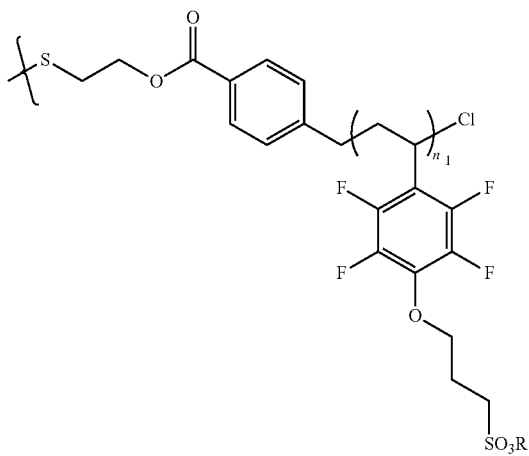

with R and $n_1$ being as defined here above.

The curly bracket indicates location at which the grafts are bound to the particles.

The particles may in addition be covalently bound to a carbonaceous material.

Such particles are particularly interesting because they make it possible to transpose the phenomenology of the triple point to the molecular scale, the role of the catalyst being fulfilled by the constituent material of the particle as such, the role of the proton conductor being fulfilled by the aforementioned polymers and the role of the electronic conductor being fulfilled by the carbonaceous material. The covalent bonds between the electronic conductor and the catalyst on the one hand and between the proton-conducting material and the catalyst on the other hand ensure, firstly, a better transfer of the charges (respectively, electrons and protons) and therefore better performances and, secondly, perfect stability in the fuel cell operating conditions, when these particles are used in fuel cells or batteries. These two results make it possible to reduce the catalyst loading rate for enhanced performance.

As already mentioned for the method, the particles comprising of a material that is suitable for catalysing oxygen reduction or hydrogen oxidation may be metal particles, that is to say particles comprising one or more metallic elements (in which case, where there exist a plurality of metallic elements they are referred to as particles of metal alloy(s)).

Metal particles that are particularly suitable may be particles comprising a noble metal, such as platinum, ruthenium, palladium and mixtures thereof.

When the particles obtained according to the invention are intended to be used in PEM fuel cells, the metal particles are advantageously platinum particles.

With regard to the carbonaceous material, where it is present, it may be graphite, carbon black, carbon fibres, carbon tubes (such as carbon nanotubes), graphene.

The ratio between the carbonaceous material and platinum may be comprised between 80/20 and 20/80, ideally between 45/55 and 65/35.

The particles of the invention can be used in the constitution of fuel cell electrodes, in particular PEMFC type fuel cells, more particularly in the catalytic layers of fuel cell electrodes.

Thus, the invention also relates to electrodes comprising such particles and to fuel cells comprising at least one electrode-membrane-electrode assembly, in which at least one of the electrodes thereof is an electrode according to the invention.

These particles are dispersible in an alcohol solution. It is therefore possible to mix them with a proton-conducting ionomer in proportions ranging from 100/0 to 70/30. The solution can then be deposited on any type of carbonaceous porous support (fabric or felt) and used as a fuel cell electrode.

Indeed moreover, the particles of the invention, upon being incorporated into fuel cells, provide the ability to obtain improvement in various properties, such as cell performance at high current densities.

Moreover, these particles exhibit an electrocatalytic activity even when they are effectively implemented without a Nafion® type ionomer. This particularly remarkable result makes it possible to produce electrodes without Nafion®. When combined with membranes that are alternative to Nafion®, these particles will provide the means to make membrane/electrode assemblies that are free of any Nafion®.

Thus, fuel cells, for example of the PEMFC type, conventionally comprise at least one electrode-membrane-electrode assembly, in which at least one of the electrodes thereof is produced using as base material the particles in accordance with the invention.

As for the membrane, it may be produced using as base material a proton-conducting polymer material, it being possible for the one or more constituent polymer(s) of this material to be the same nature as the one or more polymer(s) grafted to the surface of the said particles.

The polymers used for grafting the particles of the invention are novel and correspond to the following formula (III):

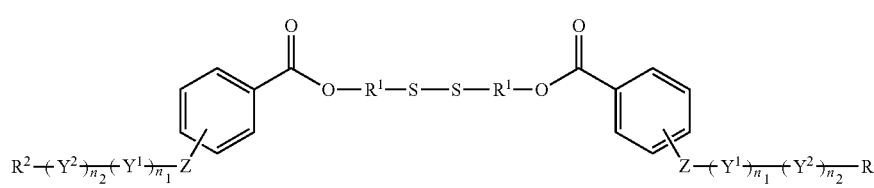

(III)

in which:

$Y^1$ corresponds to the repeating unit resulting from the polymerisation of a fluorinated styrenic monomer, optionally bearing at least one proton-conducting group, optionally in the form of a salt, and $n_1$ corresponds to the number of repetitions of the repeating unit placed within parentheses, this number of repetitions being a positive integer that is at least equal to 2;

$Y^2$ corresponds to the repeating unit resulting from the polymerisation of a non-fluorinated styrenic monomer bearing at least one proton-conducting group, optionally in the form of a salt, and $n_2$ corresponds to the number of repetitions of the repeating unit placed within parentheses, this number of repetitions being equal to 0 or being a positive integer that is at least equal to 2;

$R^1$, $R^2$ and Z being as defined here above.

The possible variations provided here above for the definitions of $R^1$, Z, $Y^1$, $Y^2$, $R^2$, $n_1$ and $n_2$ can be used for the definition of the polymers of the invention.

In particular, the groups $R^1$ may be identical to one another, just as the groups Z may be identical to one another and the groups $R^2$ may be identical to one another. More specifically, $R^1$ and Z represent an alkylene group and $R^2$ a halogen atom, such as chlorine.

The group $-Z-(Y^1)_{n1}-(Y^2)_{n2}-R^2$ may also be in para-position relative to the group $-CO-O-$.

$Y^1$ may represent a repeating unit having the following formula (XIV):

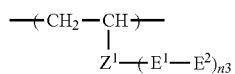

(XIV)

with $Z^1$, $E^1$, $E^2$ and $n_3$ being as defined here above;
and more specifically, a repeating unit having the following formula (XV):

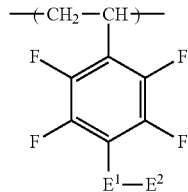

(XV)

with $E^1$ and $E^2$ being as defined here above;
and even more specifically, a repeating unit corresponding to one of the following formulas (XVI) to (XVIII):

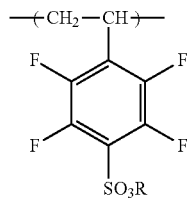

(XVI)

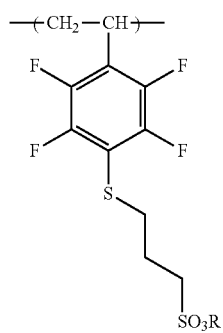

(XVII)

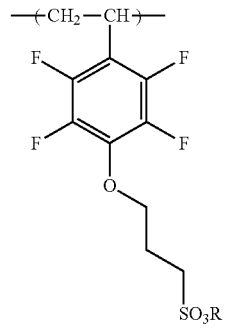

(XVIII)

with R being as defined here above.

When $Y^2$ exists, $Y^2$ may represent a repeating unit resulting from the polymerisation of a styrenic monomer having the formula (XII) or (XIII) mentioned above, such as a sodium styrene sulfonate monomer.

By way of examples, the repeating unit $Y^2$ may correspond to one of the following formulas (XIX) and (XX):

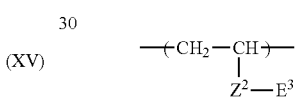

(XIX)

(XX)

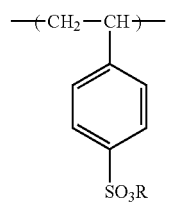

with $Z^2$, $E^3$ and R being as defined here above.

In particular, $n_2$ may be equal to 0, in which case the polymer will thus correspond to the following formula (XXI):

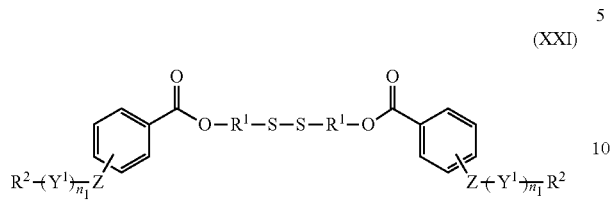

(XXI)

The specific polymers in accordance with the invention may be polymers having the following formula (XXII):

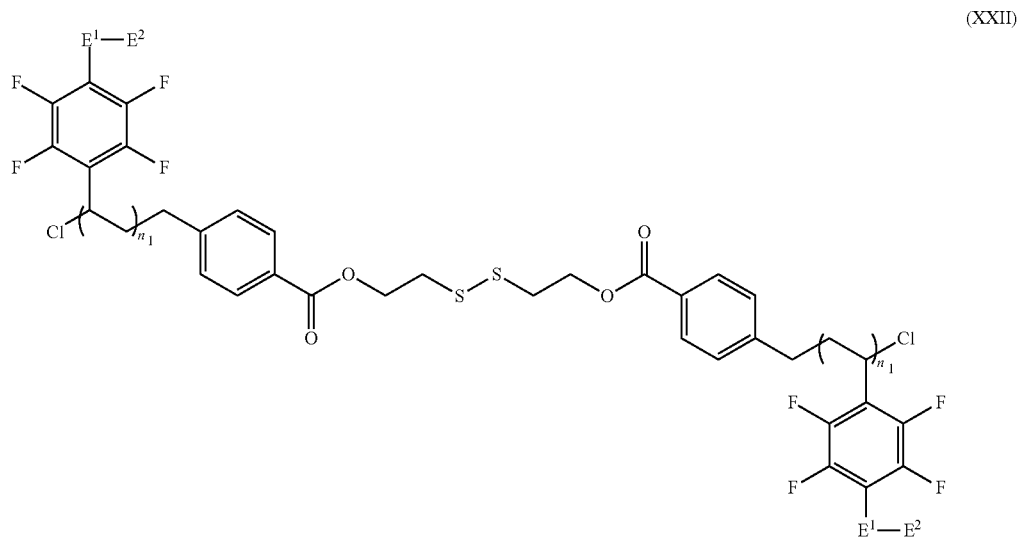

(XXII)

in which $n_1$, $E^1$ and $E^2$ are as defined here above.

In an even more specific manner, the polymers in accordance with the invention may correspond to one of the following formulas (XXIII) to (XXV):

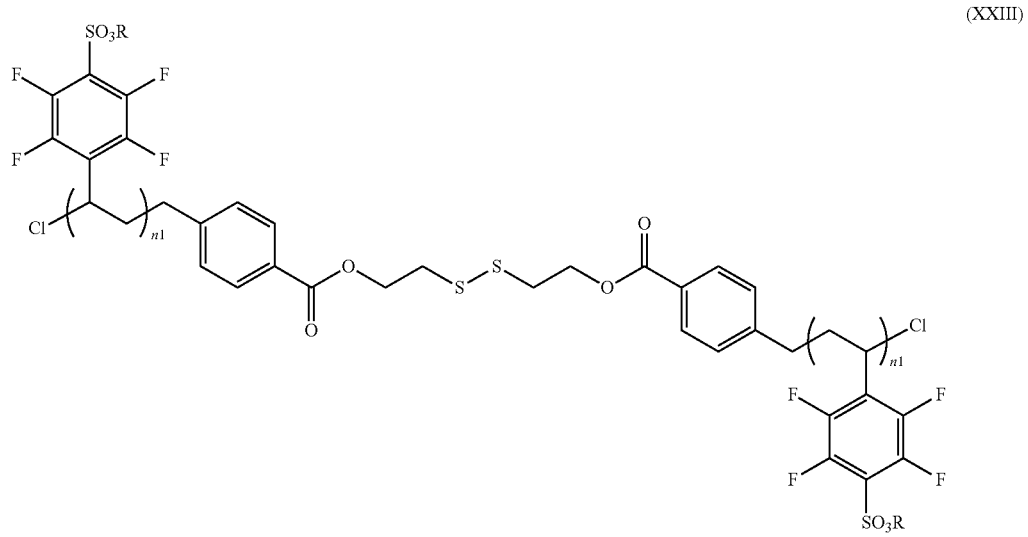

(XXIII)

-continued

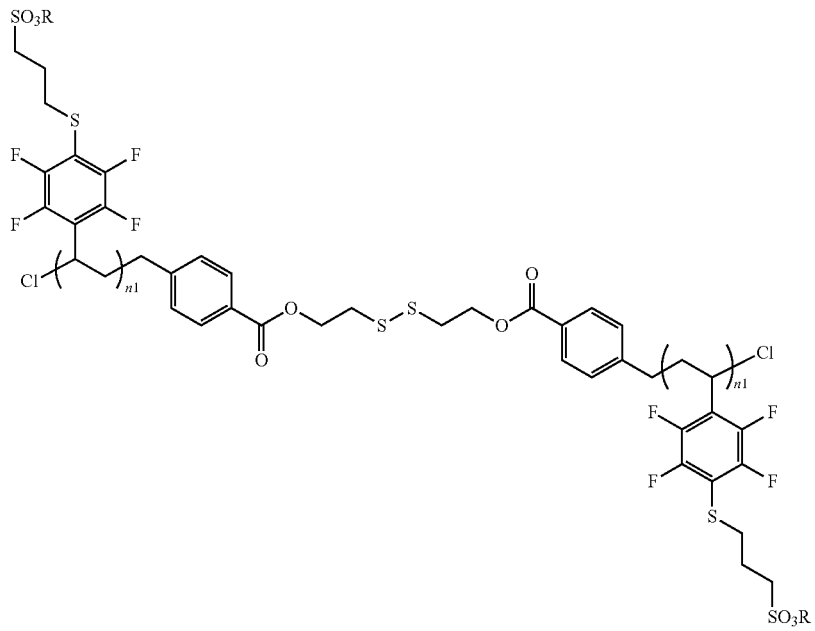

(XXIV)

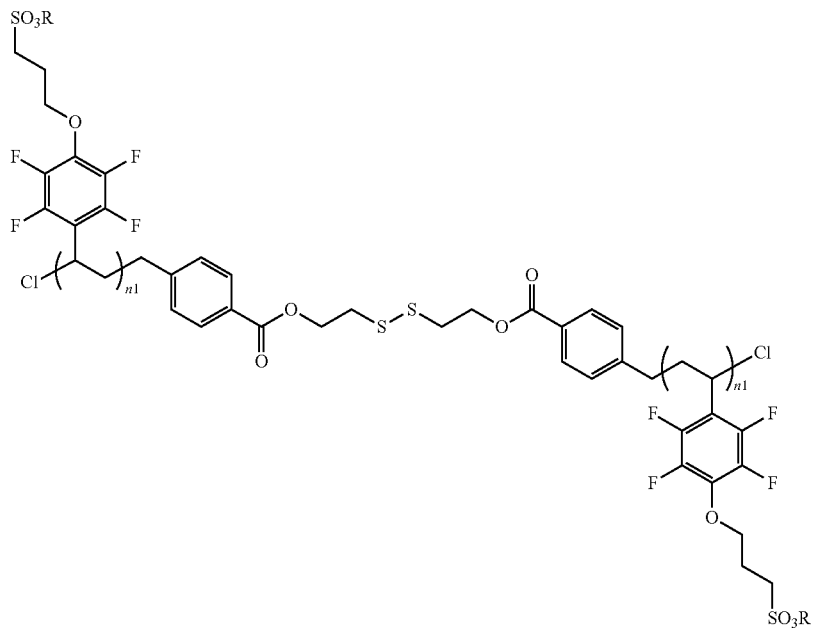

(XXV)

with R and $n_1$ being as defined here above.

The invention will now be described, in relation to the following examples provided purely by way of illustration and without any limitation whatsoever.

DETAILED DESCRIPTION OF PARTICULAR EMBODIMENTS

Example 1

Figure 1:
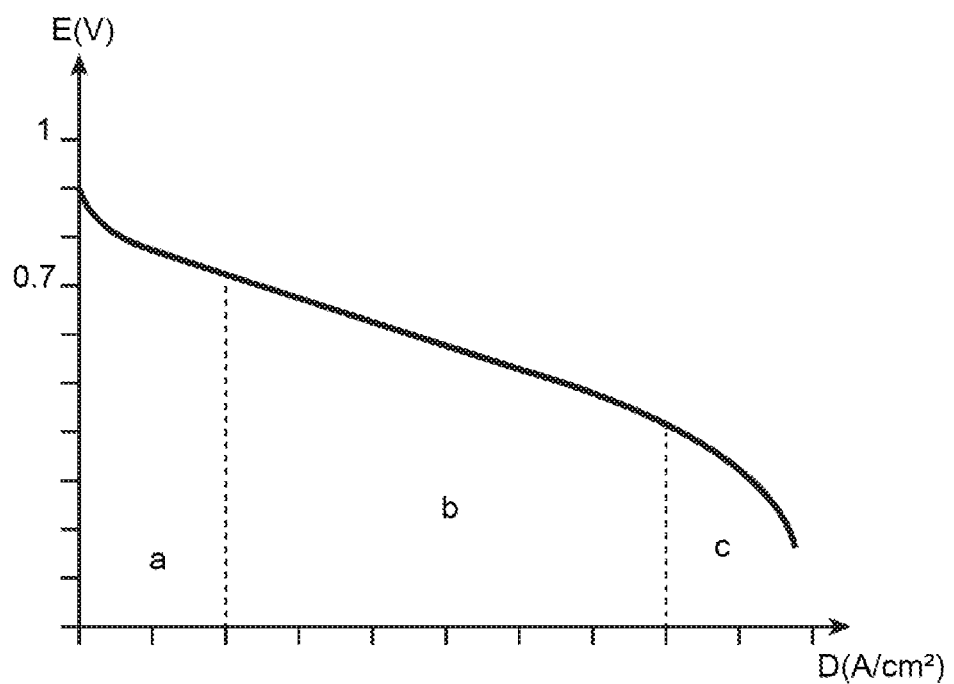
FIG. 1 is a polarisation curve illustrating the evolution of the voltage E (in V) as a function of the current density D (in A/cm$^2$).

This example illustrates the preparation of platinum particles bound to a carbon black-type carbonaceous material (in the following formula referred to as "Vulcan XC72") according to the following reaction scheme:

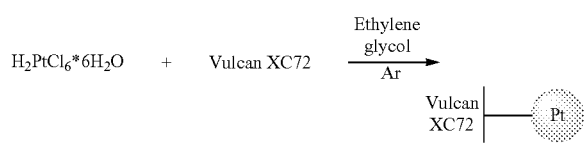

During an initial stage, the salt H₂PtCl₆*6H₂O (267 mg) is dissolved in 100 mL of ethylene glycol. The pH is then about 0.8. It is adjusted to 11 by adding of a solution of sodium hydroxide in the ethylene glycol.

The previously finely ground carbon (Vulcan XC72; 0.145 mg) is then added to the solution as prepared here above and the resulting admixture is placed under ultrasound until total dispersion of the carbon is obtained.

The mixture is then heated by microwave irradiation and under an inert atmosphere of nitrogen (heat-up time 5 minutes, 5 minutes at 100° C., power of 1600 W and impulsion/pulse at 80%).

The pH obtained at the end of the synthesis is equal to 11 at a temperature of 18° C. This pH is adjusted to 2 by adding of a solution of hydrochloric acid and then 50 mL of Milli-Q ultra pure water are added in order to homogenise the mixture. The solution is then placed under ultrasound for a period of 5 minutes.

The particles obtained are isolated by ultrafiltration then rinsed abundantly with Milli-Q ultra pure water and then dried at 60° C. in an oven before being heat treated at 200° C. for a period of 2 hours in an oven.

Example 2

This example illustrates the preparation of a polymer by means of the ATRP process with a specific ATRP initiator which may be represented schematically by the following formula:

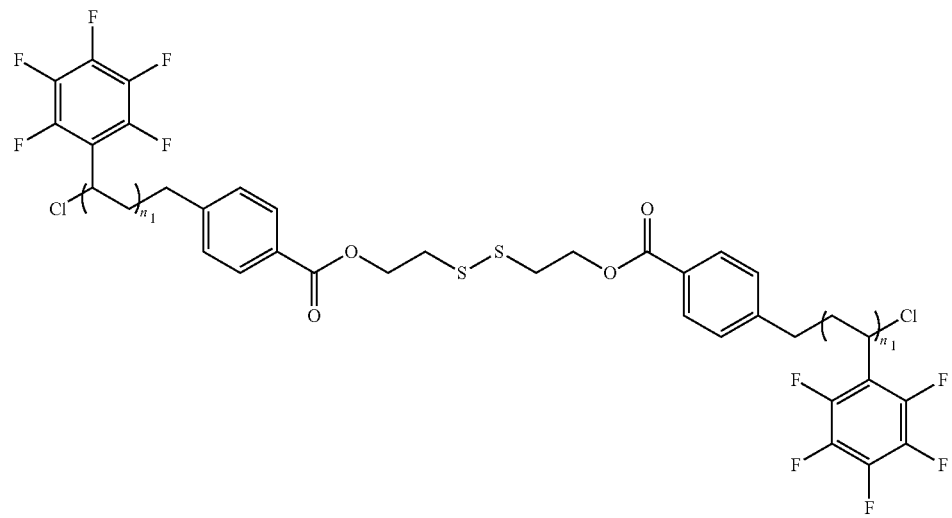

with $n_1$ corresponding to the number of repetitions of the repeating unit placed within parentheses, the reaction scheme of the polymerisation being as follows:

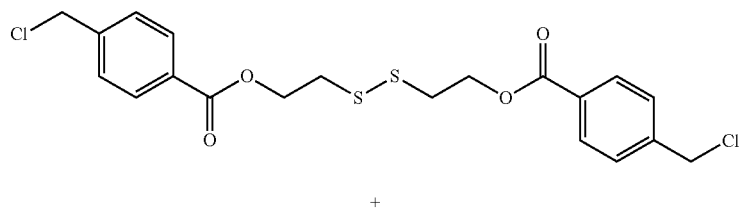

+

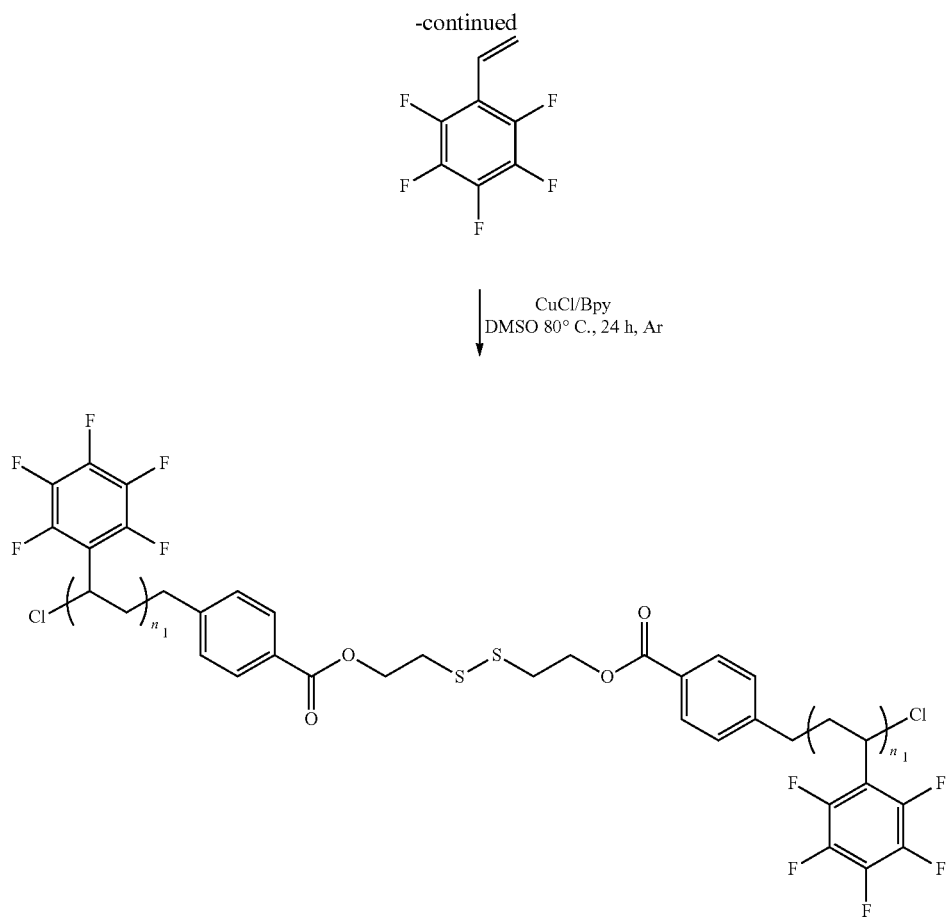

Two tests (referred to as Test 1 and Test 2) were carried out with different quantities for the monomer, the other ingredients being used based on the same quantities for these two tests.

In order to do this, during an initial stage, a 50 mL two neck flask is subjected to a heat treatment under vacuum comprising of 3 cycles with a heating phase and a cooling phase for cooling at room temperature.

Then a quantity of dimethylsulfoxide (DMSO) degassed under vacuum by inducing bubbling of argon (15 minutes) is introduced into the two neck flask. 2,3,4,5,6-pentafluorostyrene (6.7 mL, 1000 eq for Test 1 and 16.8 mL, 2500 eq for Test 2) and the ARTP initiator (23 mg, 0.1 mmol, 1 eq) are introduced under an argon stream and the argon is returned to bubble under vacuum.

When the initiator is completely dissolved in the reaction mixture, bipyridine (58 mg, 8 eq) and copper chloride (19 mg, 4 eq) are introduced under the flow of an argon stream. Three vacuum-argon cycles are finally performed.

Then the two neck flask is set in place in an oil bath heated in advance to 80° C. After a period of about 5 hours of polymerisation, the reaction is stopped by allowing the system to be aired. The solution thus changes colour going from a brown to a green-blue colour.

The polymer is finally precipitated in isopropanol and is recovered in the form of a sticky white solid before drying.

The polymer is dried overnight in an oven at 60° C.

The resulting polymer corresponds to the expected product having the formula noted here above according to the $^1$H NMR and $^{19}$F NMR spectroscopic analyses, the results of which are given here below.

$^1$H NMR (300, 13 MHz, THF-d8, δ=1.73 ppm) δ: 2.9 (s large, CH); 2 (s large, $CH_2$ of the repeating unit)

$^{19}$F NMR (282.40 MHz, THF-d8, ppm): −143 (m, F ortho), −157 (m, para); −164 (m, meta)

The $^1$H NMR analysis also demonstrates that the degree of conversion of the monomers is comprised between 60 and 70%.

Steric exclusion chromatography in tetrahydrofuran made it possible to determine the molar masses by number (Mn) and by weight (Mw), the polydispersity indices (Ip). The results are shown in the table here below (the first line being for Test 1 and the second line being for Test 2).

| $DP_{n\ theoretical}$ | $M_{n\ theoretical}$ | Conversion [a] | $M_{n\ experimental}$ [b] | $M_{w\ experimental}$ [b] | $I_p$ |
|---|---|---|---|---|---|
| 1000 | 194 600 | 68 | 132 300 | 158 800 | 1.20 |
| 2500 | 485 700 | 63 | 306 000 | 385 600 | 1.26 |

[a] calculated by $^1$H NMR;
[b] calculated by SEC analysis in THF

Example 3

This example illustrates the preparation of a sulfurised polymer obtained by means of sulfurisation of the polymers obtained in the Tests 1 and 2 of Example 2.
The reaction scheme is as follows:

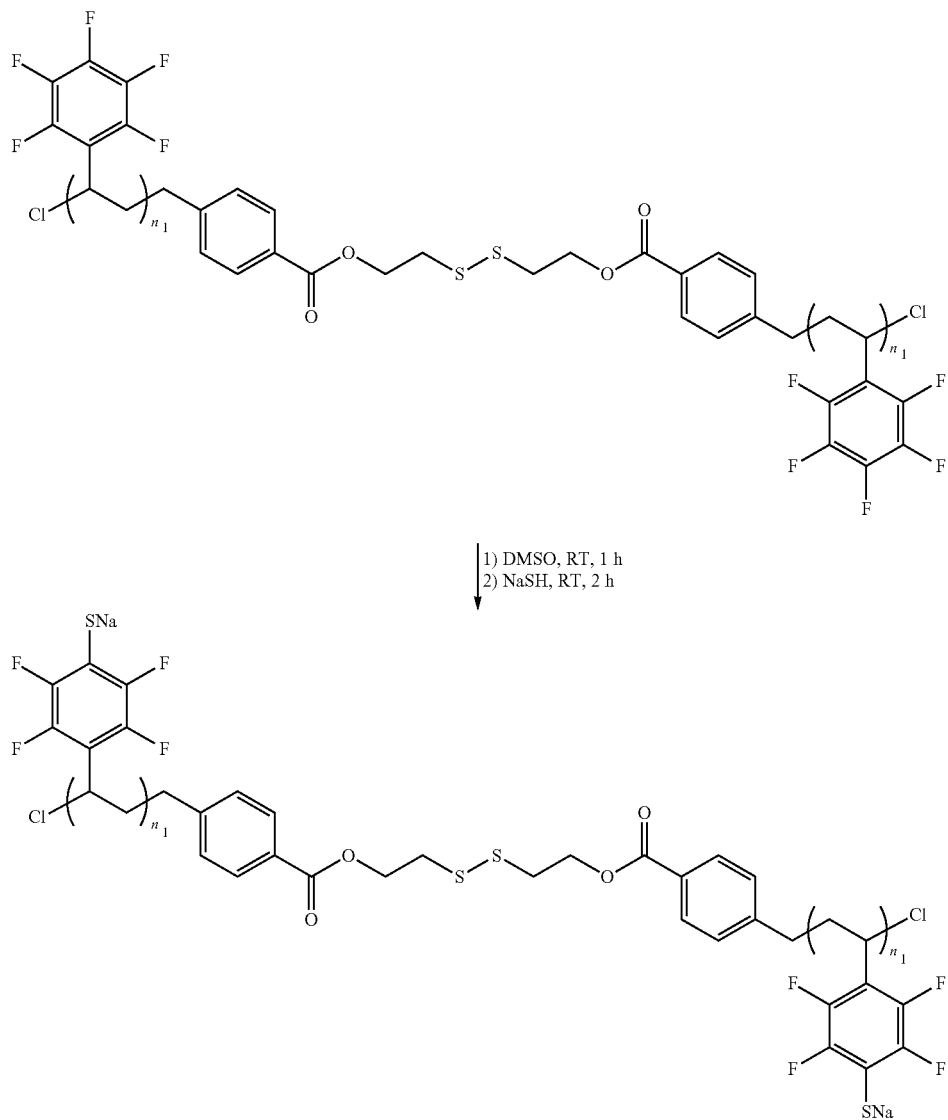

1) DMSO, RT, 1 h
2) NaSH, RT, 2 h

In a 25 mL flask the polymer obtained in Example 2 (2 g) is dispersed in dimethylsulfoxide (DMSO) (20 mL) at room temperature (RT) for a period of 1 hour. Then hydrated sodium hydrogen sulphate (1.2 eq in relation to the number of moles of monomer units) is introduced slowly into the flask at room temperature (RT). It is observed that there is a change in colour from pale yellow to blue and then disappearance of the blue colouration. At the end of 30 minutes the reaction mixture takes on a blue colour and then, at the end of the reaction (after a period of 2 hours), the medium constitutes a homogeneous system that is blue in colour and exhibits a high viscosity.

The crude reaction mixture is diluted with water and is precipitated two times in isopropanol.

The resulting polymer is a yellow solid, which is dried overnight in the oven at 60° C.

The resulting polymer corresponds to the expected product having the formula noted here above according to the $^{19}F$ NMR spectroscopic analysis, the results of which are given here below.

$^{19}F$ NMR (282.40 MHz, $D_2O$): −138 (m, F meta), −151 (m, F ortho)

They provide substantiation, in particular, of the disappearance of the signal relative to fluorine in the para-position, this position being now occupied by a group —SNa.

Example 4

This example illustrates the preparation of a sulfonated polymer obtained by means of sulfonation of the polymer obtained in Example 3.

The reaction scheme is as follows:

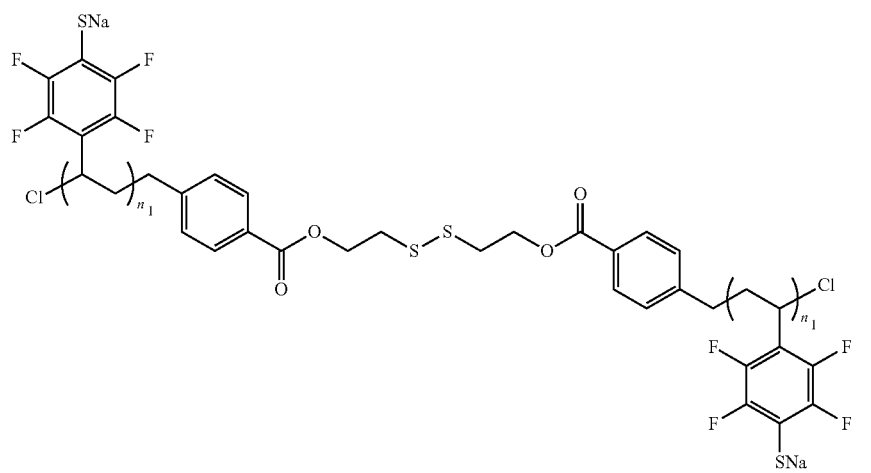

1) Glacial Formic Acid, RT, 1 h
2) $H_2O_2$ (30% weight), 0° C.
3) RT, 18 h
4) 50° C., 5 h
5) NaOH (1M), 24 h

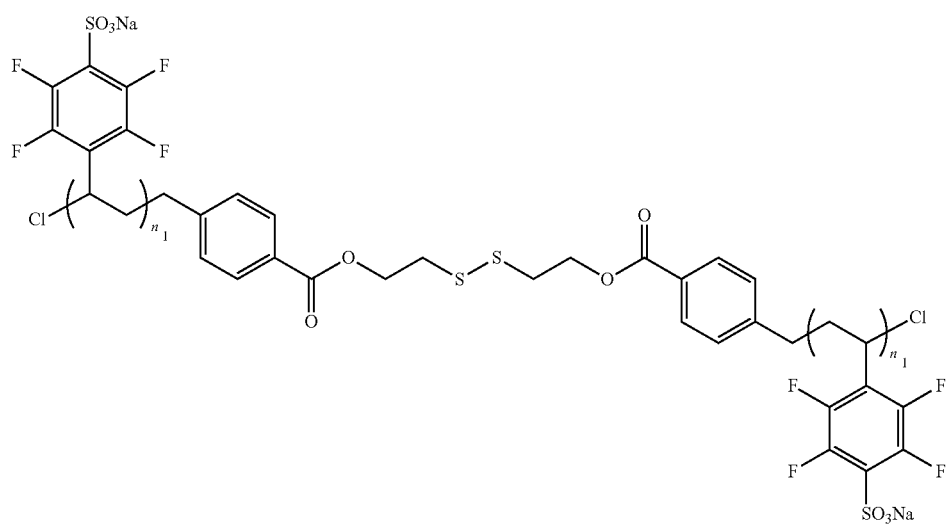

In a 100 ml flask, the polymer obtained in this Example (2 g) is placed in suspension in formic acid for a period of 30 minutes. The flask is then placed in an ice bath. After 15 minutes, hydrogen peroxide (2 eq in relation to the number of monomer units) is introduced drop by drop. The mixture is then placed at room temperature for a period of 18 hours and then set to be refluxed for a period of 5 hours.

The polymer is precipitated in isopropanol and then added into an aqueous solution of sodium hydroxide (1 M). The mixture is then agitated for a period of 24 hours. The polymer is filtered and rinsed with isopropanol. The polymer is placed in an oven at 60° C. overnight.

The resulting polymer corresponds to the expected product having the formula noted here above according to the IR and $^{19}F$ NMR spectroscopic analyses, the results of which are given below.

IR ($cm^{-1}$): 1160 and 1025 (signals corresponding to the group O=S=O)

$^{19}F$ NMR (282.40 MHz, $D_2O$): −138 (m, F meta), −142 (m, F ortho)

Example 5

This example illustrates the preparation of a sulfonated polymer having a sulfur-containing organic spacer group obtained by means of sulfonation according to the following reaction scheme:

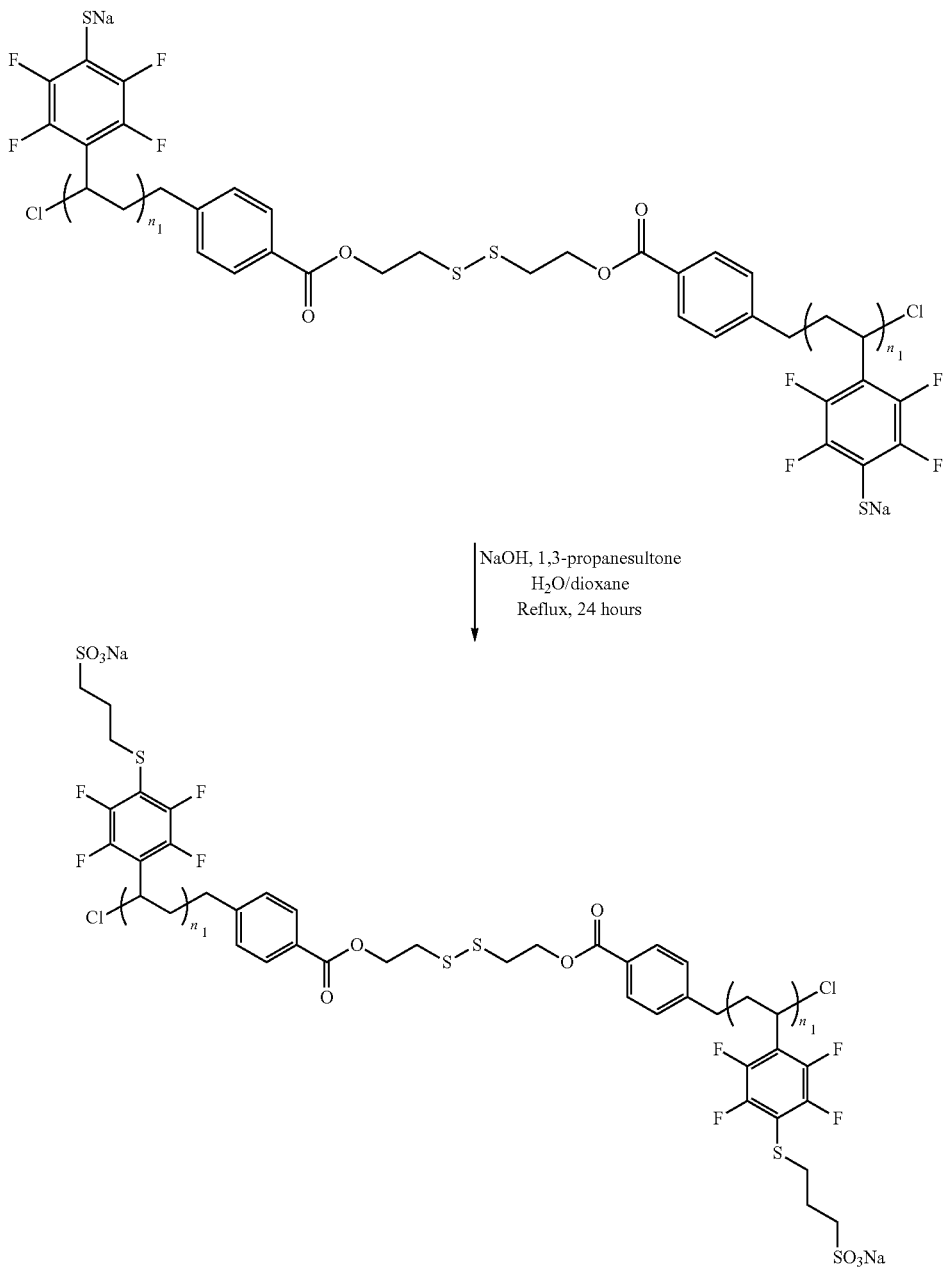

In a 25 mL flask, the polymer obtained in Example 3 (2 g) is placed in suspension in 1M sodium hydroxide at room temperature for a period of 1 hour. 1,3-Propanesultone (1.2 eq in relation to the number of moles of monomer units) is diluted in dioxane and then added drop by drop at room temperature. The mixture is then set to be refluxed for a period of 24 hours.

The mixture is filtered and washed with water. A colourless gel is obtained.

The polymer obtained is dried in an oven at 60° C. overnight.

The resulting polymer corresponds to the expected product having the formula noted here above according to the $^{19}$F NMR spectroscopic analysis, the results of which are given here below.

$^{19}$F NMR (282.40 MHz, D$_2$O, ppm): −150 (m, F meta), −164 (m, F ortho).

Example 6

This example illustrates the preparation of a sulfonated polymer comprising an oxygenated organic spacer group obtained by means of atom transfer radical polymerisation (ATRP) of a specific monomer according to the following reaction scheme:

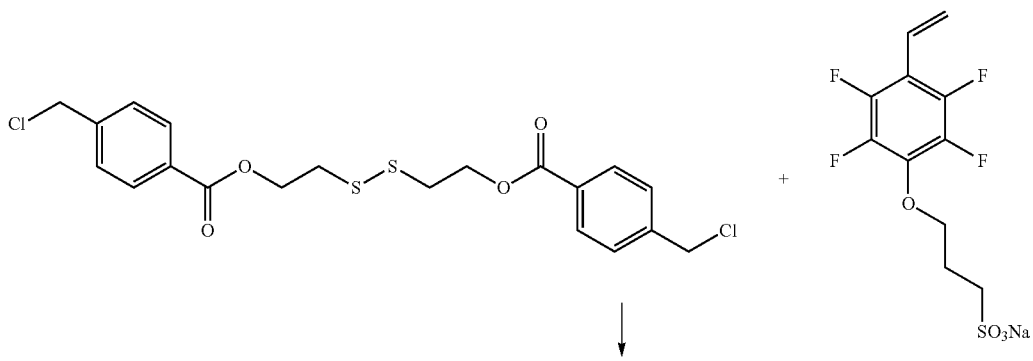

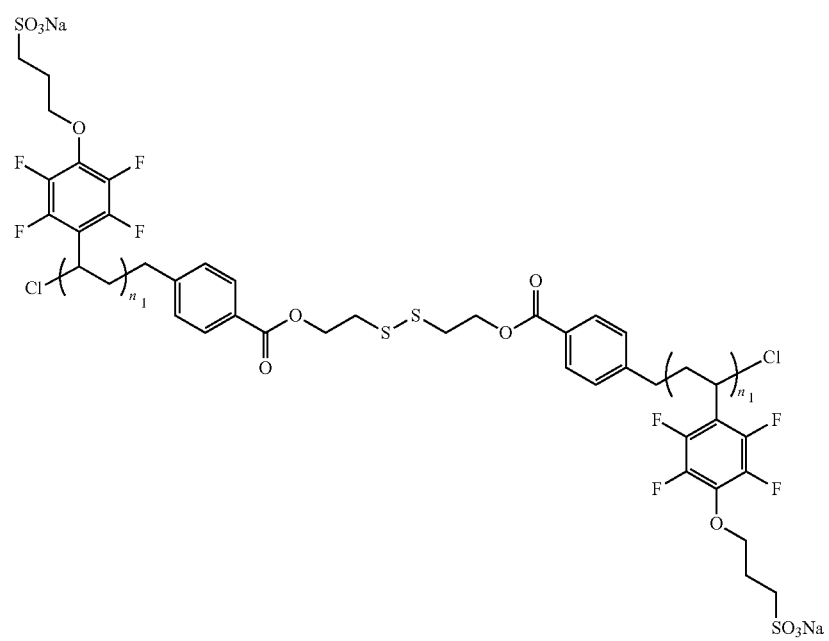

In order to do this, it is necessary during an initial stage to proceed with the preparation of the specific monomer: sodium 3-(2,3,5,6-tetrafluoro-4-vinylphenoxy) propane-1-sulfonate (step a) followed by polymerisation of the monomer with an ATRP initiator.

a) Synthesis of sodium 3-(2,3,5,6-tetrafluoro-4-vinylphenoxy) propane-1-sulfonate This step illustrates the synthesis of the monomer sodium 3-(2,3,5,6-tetrafluoro-4-vinylphenoxy) propane-1-sulfonate having the following formula:

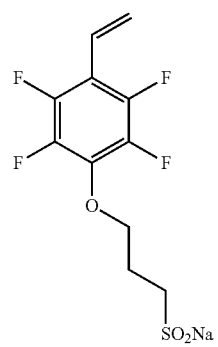

In order to do this, hydroxylated tetrafluorostyrene (the group —OH being in the para-position relative to the ethylene group) (1.5 g, 5 mmol, 1 eq) is dissolved in methanol and then sodium hydroxide (10 mmol, 2 eq) is introduced. The mixture is placed under magnetic agitation at room temperature until complete dissolution of the base is achieved. A solution of 1,3-propanesultone (0.73 g, 6 mmol, 1.2 eq) in dioxane is introduced drop by drop. The mixture is agitated at room temperature for a period of one hour and then set to be refluxed for a period of 24 hours. The solvents are eliminated by rotary evaporation and the residue is washed with dichloromethane three times. The product is then recrystallised two times in a mixture of methanol/water (2:1).

The resulting monomer corresponds to the expected product having the formula noted here above according to the IR, $^1$H NMR and $^{19}$F NMR spectroscopic analyses, the results of which are given below.

IR (cm$^{-1}$): 1183 and 1060 (signals corresponding to the group O=S=O)

$^{19}$F NMR (282.40 MHz, D$_2$O, ppm): −145 (2F, m, F meta), −160 (2F, m, F ortho)

$^1$H NMR (300.13 MHz, DMSO-d6, δ=4.75 ppm): 6.68 (dd, 1H, alkenyl CH), 5.80 (dd, 2H, alkene CH$_2$), 4.42 (t, 2H, O—CH$_2$—CH$_2$—CH$_2$—SO$_3$Na), 3.14 (t, 2H, O—CH$_2$—CH$_2$—CH$_2$—SO$_3$Na), 2.22 (m, 2H, —CH$_2$—CH$_2$—CH$_2$—SO$_3$Na).

b) Polymerisation of Sodium 3-(2,3,5,6-tetrafluoro-4-vinylphenoxy) propane-1-sulfonate In order to do this, during an initial stage, a 100 mL two neck flask is subjected to a heat treatment under vacuum comprising of 3 cycles with a heating phase and a cooling phase for cooling at room temperature.

Then the Milli-Q ultra pure water degassed under vacuum by inducing bubbling of argon (15 minutes), is introduced into the two neck flask. Sodium 3-(2,3,5,6-tetrafluoro-4-vinylphenoxy) propane-1-sulfonate (2500 eq) is introduced under the flow of an argon stream and the argon is again set to bubble under vacuum.

In parallel, in a 25 mL piriform flask, methanol (16 mL) is degassed under vacuum by inducing bubbling of argon (15 minutes) and the ATRP initiator (1 eq) is then introduced under the flow of an argon stream.

When the monomer is fully dissolved in water, bipyridine (116 mg) and copper chloride (37 mg) are introduced under the flow of an argon stream.

The argon is set to bubble through the system while drawn under vacuum.

The initiator solution in the methanol is introduced with a syringe (20 ml, being careful to condition the syringe under argon) while maintaining a flow of argon. Three vacuum-argon cycles are finally performed.

The two neck flask is set in place in an oil bath heated in advance to 45° C. After a period of about 21 hours of polymerisation, the reaction is stopped by allowing the system to be aired. The solution thus changes colour going from a brown to a green-blue colour.

The mixture is filtered on silica gel in order to remove the copper II ions (Cu$^{2+}$) contained in the catalyst system and trapped by the polymer.

The polymer is finally precipitated in cold methanol and is recovered in the form of a sticky before drying.

The polymer is then placed in an oven at 65° C. for 1 night.

The resulting polymer corresponds to the expected product having the formula noted here above according to the IR and $^{19}$F NMR spectroscopic analyses, the results of which are given here below.

$^{19}$F NMR (282.40 MHz, D$_2$O, ppm): −150 (m, F in meta), −165 (m, F in ortho)

IR (cm$^{-1}$): 1183 and 1040 (signals corresponding to the group O=S=O)

Example 7

This example illustrates the preparation of platinum particles prepared according to Example 1 grafted with the polymer prepared in Example 5, these particles thus being grafted with grafts having the following formula:

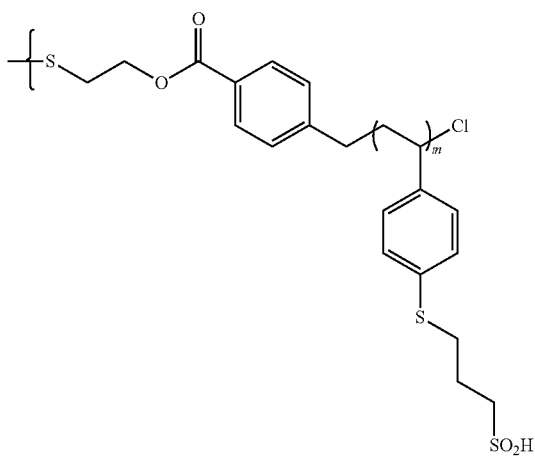

n$_1$ indicating the number of repetitions of the repeating unit placed within parentheses.

In order to do this, the particles prepared in Example 1 (100 mg) and hexylamine (10 ml) are introduced into a 25 ml flask. The flask is placed for 15 minutes in an ultrasonic bath in order for the suspension of particles to become homogeneous. The polymer obtained in Example 5 (2 mg) is dissolved in a water/hexylamine mixture (50/50 by volume) and is then introduced into the flask. The latter in its entirety is then placed under magnetic agitation for a period of 12 hours.

The functionalised platinum particles are precipitated in acetone and then subjected to various different steps of washing (3*30 ml of acetone, 3*30 ml of ethanol and 3*30 ml of water).

These washing steps make it possible to eliminate the traces of polymers that are likely to not have been grafted on to the particles.

The particles are then placed overnight in an oven at 65° C.

A similar preparation may easily be envisaged with the polymers prepared as in Examples 4 and 6.

Example 8

In this example, the particles obtained in Example 7 are incorporated in the electrodes and then subjected to in-cell (referred to as Cell 1) tests intended for purposes of comparison with respect to a cell that is similar but including an electrode comprising platinum particles supported on carbon dispersed in Nafion® (referred to as Cell 2) and a similar cell including an electrode comprising particles grafted with grafts having the following formula (I').

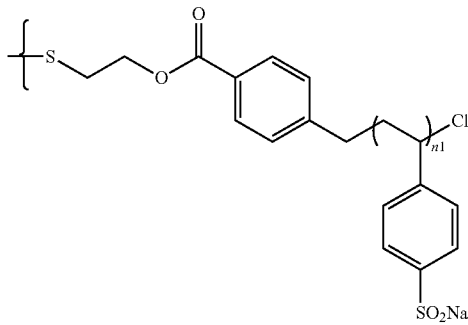

with $n_1$ indicating the number of repetitions of the repeating unit placed within parentheses, referred to as cell 3.

In order to do this, each cell includes an electrode-membrane-electrode assembly comprising:
- an anode of the gas diffusion electrode type comprising 0.2 mg/cm² of commercially available platinum particles bound to a carbonaceous material (these particles being ungrafted);
- a cathode of the gas diffusion electrode type comprising 0.4 mg/cm² of specific platinum particles;
- a membrane made of Nafion® NRE 211 disposed between the anode and the cathode.

For Cell 1, the cathode comprises the platinum particles obtained in Example 7.

For Cell 2, the cathode comprises the platinum particles supported on carbon dispersed in Nafion®.

For Cell 3, the cathode comprises platinum particles supported on carbon grafted with grafts having the formula (I') noted here above.

The electrode-membrane-electrode assemblies are produced according to the following operating protocol.

Regardless of whether they are for the anode or the cathode, these are prepared by simply casting a catalytic ink comprising the platinum particles concerned in a mixture of ethanol/water (3:1) on a Sigracet® 24BC gas diffusion layer (GDL).

Prior to being placed in the assembly, the Nafion® membrane is previously treated by hot pressing by having a reinforcement backing pressed on to each side thereof at a temperature of 110° C. and a pressure of 3 MPa for 90 seconds.

Finally, the gas-diffusion electrodes (anode and cathode) are pressed on to each side of the Nafion® membrane thus treated in advance, at a temperature of 115° C., and then at a pressure of 3.5 MPa for 150 seconds at a temperature of 135° C.

The tests are carried out in a single cell of 5 cm² under $H_2/O_2$ (stoichiometry $\lambda_{O2}=1.5$ and $\lambda_{H2}=1.5$) under a pressure of 2 bar, at 60° C. and at 21% humidity.

Figure 2:
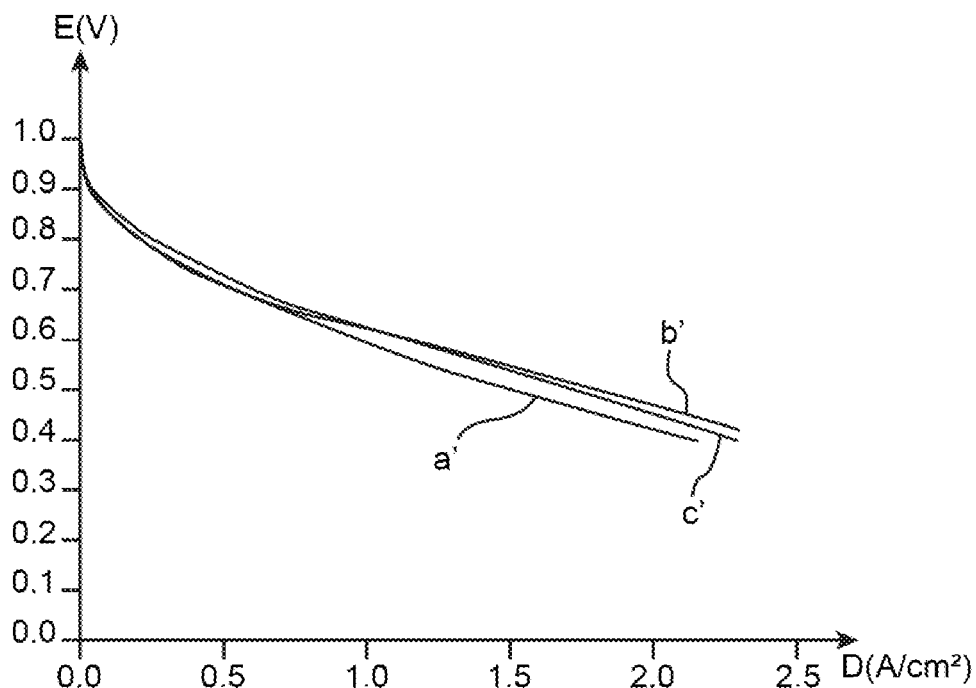
FIG. 2 represents the evolution curves showing evolution of the voltage E (in V) as a function of the current density D (in A/cm$^2$) (curve a' for Cell 1, curve b' for Cell 2 and curve c' for Cell 3).

The evolution curves showing evolution of the voltage E (in V) as a function of the current density (in A/cm²) are reported in FIG. 2 (curve a' for Cell 1, curve b' for Cell 2 and curve c' for Cell 3).

The curve b' represents the behaviour of a conventional electrode constituted of platinum nanoparticles supported on carbon and dispersed in Nafion®. At high current densities, an inflection of the curve that is characteristic of a start of flooding of the electrodes is observed.

The curve c' represents the behaviour of an electrode constituted of platinum nanoparticles supported on carbon and grafted with grafts having the formula (I'). At high current densities, it is also observed that there is a slight inflection of the curve.

The curve a' represents the behaviour of an electrode according to the invention. At high current densities, it is observed that there is no more inflection of the curve, which is a reflection of the absence of flooding of the electrodes.

The durability of such cells has also been tested, this test consisting in following the evolution as a function of time of the cell voltage at fixed current density (1 A·cm⁻²).

The tests were conducted at 36° C., which represents the equilibrium temperature of an unheated cell.

Figure 3:
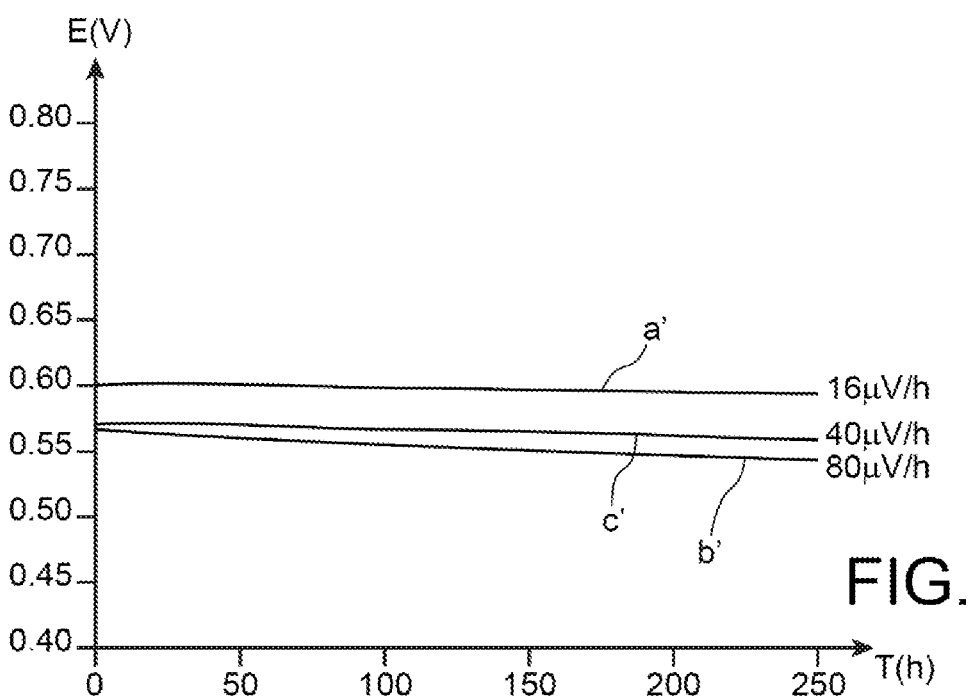
FIG. 3 represents the evolution curves showing evolution of the voltage E (in V) as a function of time T (in hours) (curve a' for Cell 1, curve b' for Cell 2 and curve c' for Cell 3).

The results are reported in FIG. 3, with the curve a' for the Cell 1, the curve b' for the Cell 2 and the curve c' for the Cell 3.

The cell according to the invention exhibits a lesser decline, which reflects a lower sensitivity to aging. This phenomenon is explained by the better chemical stability of the particles of the invention in the corrosive medium of the cell.

What is claimed is:

1. Particles comprising a material for catalysing oxygen reduction or hydrogen oxidation and being grafted by grafts having the following formula (III):

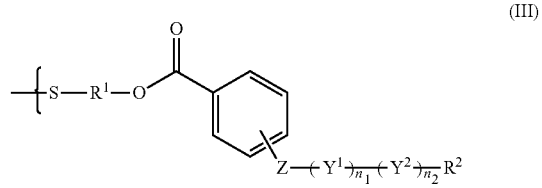

a curly bracket indicating the location at which the grafts are bound in a covalent manner to the particles in which:
$R^1$ represents an organic spacer group;
Z represents a single bond or an organic spacer group;
$R^2$ represents a halogen atom;
$Y^1$ corresponds to a repeating unit resulting from polymerisation of a fluorinated styrenic monomer, and $n_1$ corresponds to a number of repetitions of the repeating unit placed within parentheses, this number of repetitions being a positive integer that is at least equal to 2;
$Y^2$ corresponds to a repeating unit resulting from polymerisation of a non-fluorinated styrenic monomer bearing at least one proton-conducting group, and $n_2$ corresponds to a number of repetitions of the repeating unit placed within parentheses, this number of repetitions being equal to 0 or being a positive integer that is at least equal to 2;
and the group —Z—$(Y^1)_{n1}$—$(Y^2)_{n2}$—$R^2$, which intersects a carbon-carbon bond of the phenyl group, signifying that it can be bound to any one of the carbon atoms of the phenyl group.

2. Particles according to claim 1, in which the group —Z—$(Y^1)_{n1}$—$(Y^2)_{n2}$—$R^2$ is in the para-position relative to the group —CO—O—.

3. Particles according to claim 1, in which $R^1$ and Z represent an alkylene group and $R^2$ represents a halogen atom.

4. Particles according to claim 1, in which $Y^1$ represents a repeating unit having the following formula (XV):

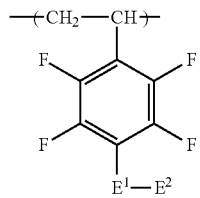

(XV)

$E^1$ corresponds to a single bond or an organic spacer group; and
$E^2$ corresponds to a proton-conducting group.

5. Particles according to claim 1 in which, when $Y^2$ exists, $Y^2$ is a repeating unit resulting from the polymerisation of a styrenic monomer having the following formula (XII):

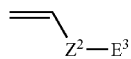

(XII)

wherein:
$Z^2$ corresponds to a phenylene group; and
$E^3$ corresponds to a proton-conducting group.

6. Particles according to claim 1, in which the particles are platinum particles bound to a carbonaceous material selected from graphite, carbon black, carbon fibers, carbon tubes, and graphene.

7. Particles according to claim 1, in which $n_2$ is equal to 0.

8. Particles according to claim 1, which are platinum particles grafted with grafts having the following formulas:

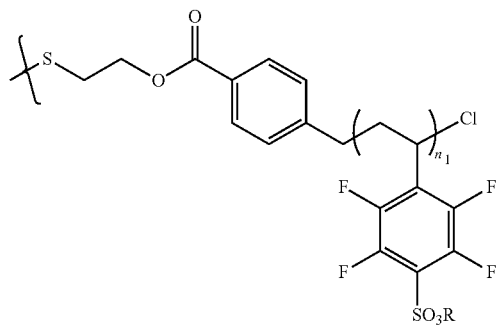

(XXII)

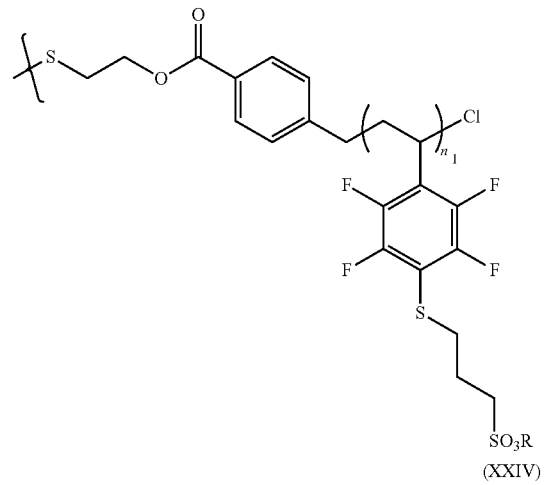

(XXIII)

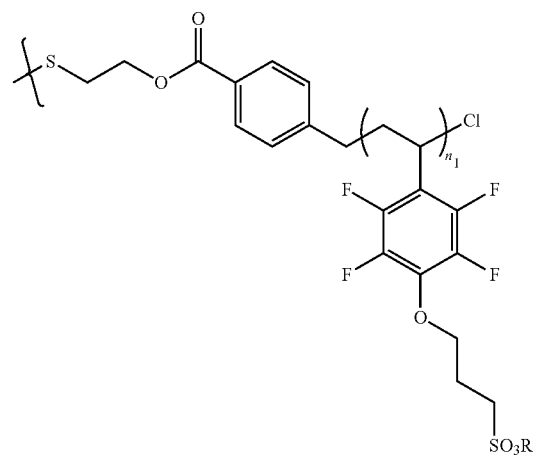

(XXIV)

wherein R is a hydrogen atom or a cation and $n_1$ corresponds to the number of repetitions of the repeating unit placed within parentheses, this number of repetitions being a positive integer that is at least equal to 2.

9. An electrode comprising particles as defined according to claim 1.

10. A fuel cell comprising at least one electrode-membrane-electrode assembly, in which at least one of the electrodes thereof is an electrode as defined in claim 9.

* * * * *